(12) United States Patent
Wang et al.

(10) Patent No.: US 9,204,143 B2
(45) Date of Patent: Dec. 1, 2015

(54) IMAGE SENSOR, OPERATION METHOD THEREOF, AND SYSTEM INCLUDING THE SAME

(71) Applicants: Yibing Wang, Pasadena, CA (US); Yoon Dong Park, Osan-Si (KR); Dong-Ki Min, Seoul (KR); Won Ju Kim, Hwaseong-si (KR)

(72) Inventors: Yibing Wang, Pasadena, CA (US); Yoon Dong Park, Osan-Si (KR); Dong-Ki Min, Seoul (KR); Won Ju Kim, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 200 days.

(21) Appl. No.: 13/832,071

(22) Filed: Mar. 15, 2013

(65) Prior Publication Data
US 2014/0263953 A1 Sep. 18, 2014

(51) Int. Cl.
*H01L 27/00* (2006.01)
*H04N 17/04* (2006.01)

(52) U.S. Cl.
CPC ......... *H04N 17/04* (2013.01); *G09G 2320/103* (2013.01)

(58) Field of Classification Search
CPC ................ H04N 17/04; G09G 2320/103
USPC ...................................... 250/208.1
See application file for complete search history.

(56) References Cited

U.S. PATENT DOCUMENTS

| | | | |
|---|---|---|---|
| 6,660,989 B2 | 12/2003 | Guo et al. | |
| 6,828,540 B2 | 12/2004 | Landolt | |
| 6,961,157 B2 | 11/2005 | Tandon et al. | |
| 7,386,186 B2 | 6/2008 | Ovsiannikov | |
| 7,616,231 B2 * | 11/2009 | Farrier | 348/208.99 |
| 8,106,982 B2 | 1/2012 | Collins | |
| 8,368,381 B1 * | 2/2013 | Becvar et al. | 324/76.11 |
| 2008/0165258 A1 | 7/2008 | Wajs | |
| 2009/0091648 A1 | 4/2009 | Lin et al. | |

FOREIGN PATENT DOCUMENTS

| | | |
|---|---|---|
| JP | 2010-032425 | 2/2010 |
| KR | 20020009457 A | 2/2002 |

* cited by examiner

*Primary Examiner* — Thanh Luu
(74) *Attorney, Agent, or Firm* — Volentine & Whitt, PLLC

(57) ABSTRACT

A motion sensing method is implemented by an image sensor, the image sensor including a first pixel and a second pixel. The method includes outputting a first pixel signal of the first pixel during a first integration time of a frame period, outputting a second pixel signal of the second pixel during a second integration time of the frame period, and generating comparison signals indicative of a sensed moving object by comparing the first pixel signal and the second pixel signal.

15 Claims, 31 Drawing Sheets

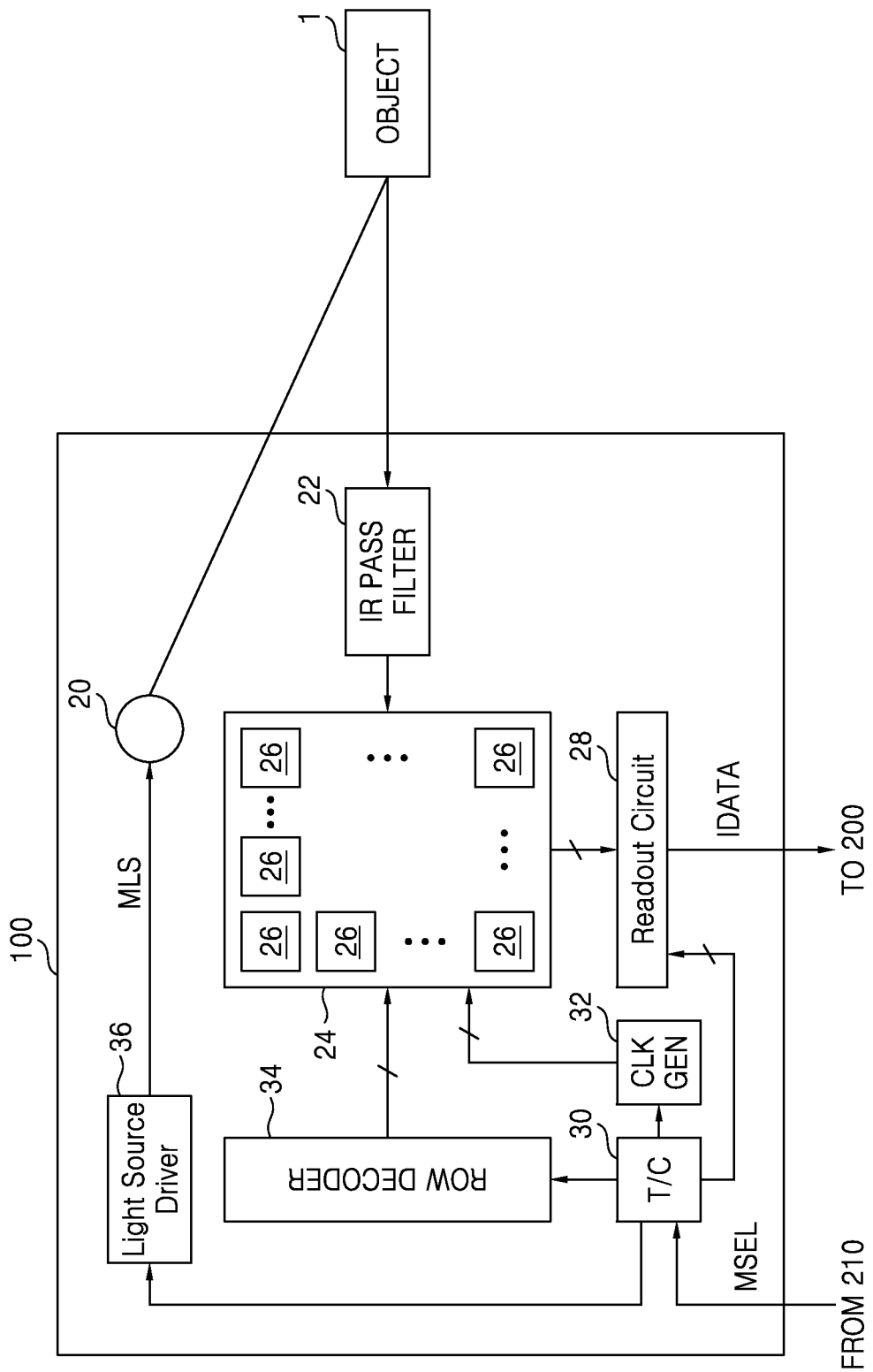

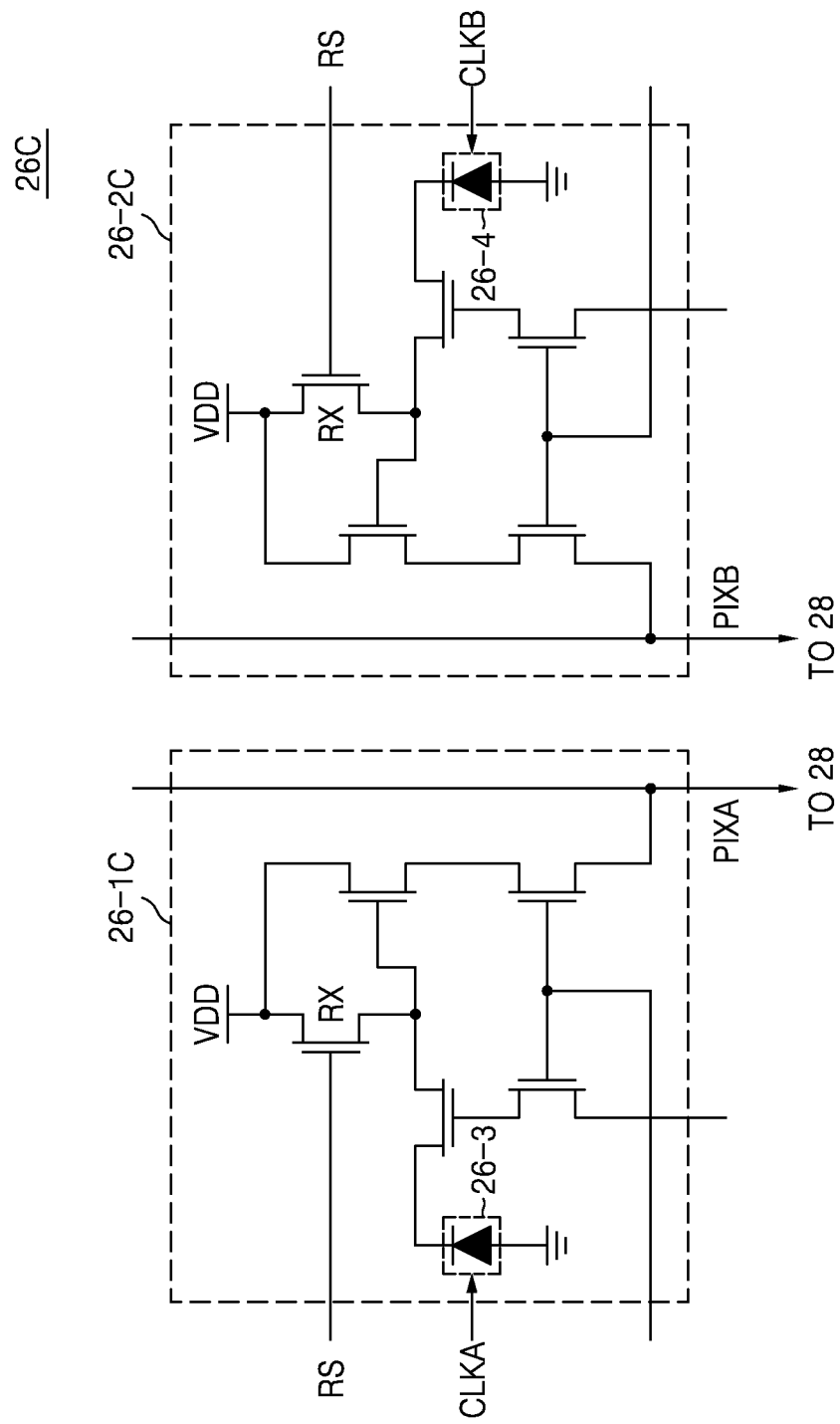

IMAGE SENSOR, OPERATION METHOD THEREOF, AND SYSTEM INCLUDING THE SAME

BACKGROUND

Embodiments of the inventive concept relate to image sensors. More particularly, embodiments of the inventive concept relate to methods and devices for processing pixel signals of an image frame, and determining the motion of an object according to a comparison result.

A complementary metal-oxide semiconductor (CMOS) image sensor is a solid-state image sensing device which leverages attributes of CMOS technology. As a result, when compared to charge coupled device (CCD) image sensors, the CMOS image sensor has lower manufacturing costs, smaller dimensions, and consumes less power. Recent improvements in CMOS image sensor performance have resulted in the CMOS image sensor being widely adopted in both non-portable home appliances and in portables (or mobile) devices such as smart phones and digital cameras.

Low power consumption in mobile devices is a high design priority, and research has been active to reduce the power consumption of CMOS image sensors. Generally, there is a trade-off between reduced power consumption and increased performance, and in the field of CMOS image sensors, efforts continue to maximize the reduction of power consumption while maintaining necessary operational characteristics.

SUMMARY

An embodiment of the present inventive concepts is directed to a motion sensing method implemented by an image sensor, the image sensor including a first pixel and a second pixel. The method includes generating a first pixel signal by using the first pixel during a first integration time of a frame period, generating a second pixel signal by using the second pixel during a second integration time of the frame period, and generating comparison signals by comparing the first pixel signal and the second pixel signal.

Another embodiment of the present inventive concepts is directed to an image sensor which includes a first pixel configured to generate a first pixel signal during a first integration time of a frame period, a second pixel configured to generate a second pixel signal during a second integration time of the frame period, and a readout circuit configured to generate comparison signals indicative of a sensed moving object by comparing the first pixel signal and the second pixel signal.

Yet another embodiment of the present inventive concepts is directed to an image sensor which includes an image sensor array including an array of unit pixels, each of the unit pixels including at least a first pixel and a second pixel. The image sensor further includes a decoder circuit configured to apply successive reset signals to the first and second pixels of the unit pixel, the successive reset signals defining a frame period of the unit pixel, where the first pixel is active during a first integration time of the frame period, and the second pixel is active during a second integration time of the frame period. The image sensor still further includes a comparator circuit configured to compare an output of the first pixel corresponding to the first integration time of the frame period and an output of the second pixel corresponding to the second integration time of the frame period, and to output a comparison result.

Still another embodiment of the present inventive concepts is direct to a system on chip (SoC) which includes an image sensor, a central processing unit (CPU) configured to transmit a mode selection signal for selecting an operation mode to the image sensor, and an image signal processor (ISP) configured to process image data output from the image sensor. The image sensor includes a first pixel configured to generate a first pixel signal during a first integration time of a frame period, a second pixel configured to generate a second pixel signal during a second integration time of the frame period, and a readout circuit configured to generate comparison signals by comparing the first pixel signal and the second pixel signal in response to the mode selection signal.

Another embodiment of the present inventive concepts is directed to an image processing system which includes an image sensor, a central processing unit (CPU) configured to transmit a mode selection signal for selecting an operation mode to the image sensor, and an image signal processor (ISP) configured to process image data output from the image sensor, and a display configured to display image data processed by the ISP. The image sensor includes a first pixel configured to generate a first pixel signal during a first integration time of a frame period, a second pixel configured to generate a second pixel signal during a second integration time of the frame period, and a readout circuit configured to generate comparison signals by comparing the first pixel signal and the second pixel signal in response to the mode selection signal.

BRIEF DESCRIPTION OF THE DRAWINGS

The above and other embodiments and aspect of the present inventive concepts will become readily apparent from the detailed description that follows, with reference to the accompanying drawings, in which:

FIG. 2 is a block diagram according to an example embodiment of the image sensor illustrated in FIG. 1;

FIGS. 5A through 5D are circuit diagrams of the unit pixel illustrated in FIG. 3A or 3B;

DETAILED DESCRIPTION OF THE EMBODIMENTS

Figure 1:
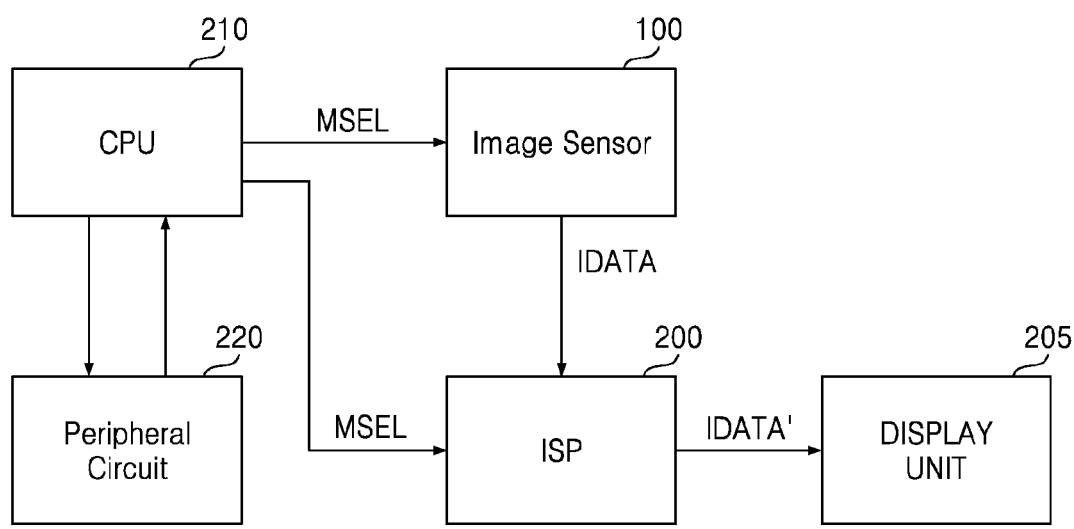
FIG. 1 is a block diagram of an image processing system according to an example embodiment of the present inventive concepts.

Certain embodiments of the inventive concept will now be described in some additional detail with reference to the accompanying drawings. The inventive concept, however, may be embodied in various different forms and should not be construed as being limited to only the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the illustrated embodiments. Unless otherwise noted, like reference numerals denote like or similar elements throughout the drawings and written description.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept. The terminology used herein is for the purpose of describing particular embodiments only and is not intended to be limiting of the inventive concept.

As used herein, the singular forms "a", "an" and "the" are intended to include the plural forms as well, unless the context clearly indicates otherwise. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein FIG. 1 is a block diagram of an image processing system according to an example embodiment of the present inventive concepts. Referring to FIG. 1, an image processing system 10 may include an image sensor 100, an image signal processor ISP 200, a display unit 205, a central processing unit (CPU) 210, and a peripheral circuit 220.

According to an example embodiment, the image processing system 10 may be embodied in a system on chip (SoC). According to another example embodiment, the image sensor 100, the ISP 200 and the CPU 210 may be embodied in a SoC.

The image processing system 10 may include the functionality of a color sensor which may acquire color information of an object or a subject, the functionality of a depth sensor which may acquire depth information of the object, and/or the functionality of a motion sensor which may acquire motion information by sensing a motion of the object.

According to an example embodiment, when the image sensor 100 includes depth sensor pixels, the image sensor 100 may transmit image data IDATA corresponding to depth information or a depth image of an object or image data IDATA corresponding to motion information or a motion image of an object to the ISP 200, according to a mode selection signal MSEL transmitted from the CPU 210.

For example, the image sensor 100 may output image data IDATA corresponding to motion information or a motion image when a mode selection signal MSEL is at a first level, e.g., a low level, and output image data IDATA corresponding to depth information or a depth image when the mode selection signal MSEL is at a second level, e.g., a high level; however, it is not restricted thereto.

According to another example embodiment, when the image sensor 100 includes color sensor pixels, the image sensor 100 may transmit image data IDATA, which include color information or motion information of an object to the ISP 200 according to a mode selection signal MSEL transmitted from the CPU 210.

For example, the image sensor 100 may output image data IDATA corresponding to motion information when a mode selection signal MSEL is at a first level, e.g., a low level, and output image data IDATA corresponding to color information when the mode selection signal MSEL is at a second level, e.g., a high level.

According to an example embodiment, the image sensor 100 may be embodied in an independent additional chip. The image sensor 100 may be embodied in a CMOS image sensor chip.

The ISP 200 may receive image data IDATA, process received image data IDATA and generate processed image data IDATA'. According to an example embodiment, the ISP 200 may process or compose image data IDATA frame by frame.

According to an example embodiment, the ISP 200 may process image data IDATA including color information, image data IDATA including depth information or image data IDATA including motion information of an object by operating under different modes according to a mode selection signal MSEL. In addition, the ISP 200 may revise light and shade, contrast and/or chroma of the image data IDATA.

The ISP 200 may transmit processed image data IDATA' to the display unit 205. The display unit 205 may may display the processed image data IDATA'. According to an example embodiment, the display unit 205 may be embodied in a liquid crystal display (LCD), a LED display, an OLED display, an active matrix organic light emitting diodes (AMOLED) display, or a flexible display.

The CPU 210 may analyze data transmitted from the peripheral circuit 220, generate a mode selection signal MSEL based on an analysis result, and transmit a generated mode selection signal MSEL to the image sensor 100 and the ISP 200.

The peripheral circuit 220 may provide data, which are characterized according to a state of the system 10 or various inputs, to the CPU 210.

According to an example embodiment, the peripheral circuit 220 may be embodied in an input interface. In this case, the peripheral circuit 220 performing a function of the input interface 220 may provide data occurred according to an input of a user to the CPU 210. The input interface may be an input device such as a button, a touch screen or a mouse. The CPU 210 may generate a mode selection signal MSEL based on the data. According to another example embodiment, the peripheral circuit 220 may be embodied in a power monitoring module. In this case, the peripheral circuit 220 embodied in the power monitoring module, when determining the system 10 is lacking power, may transmit data generated according to a determination result to the CPU 210. The CPU 210 may generate a mode selection signal MSEL based on the data.

According to still another example embodiment, the peripheral circuit 220 may be embodied in an application execution module. In this case, the peripheral circuit 220 embodied in the application execution module may monitor execution of a specific application and transmit data generated according to a monitoring result to the CPU 210. The CPU 210 may generate a mode selection signal MSEL based on the data. The specific application may be a camera driving application or an augmented reality application; however, the embodiment is not restricted thereto.

FIG. 2 is a block diagram according to an example embodiment of the image sensor illustrated in FIG. 1. For convenience of explanation, an object 1 is illustrated with the image sensor 100.

Referring to FIG. 2, the image sensor 100 may include a light source 20, an IR pass filter 22, a pixel array 24, a readout circuit 28, a timing controller 30, a clock generator 32, a row decoder 34 and a light source driver 36.

The image sensor 100 may generate image data IDATA corresponding to depth information or a depth image of the object 1 or image data IDATA corresponding to motion information or a motion image of the object 1 by using time of flight (TOF) principles according to a mode selection signal MSEL.

According to an example embodiment, the image sensor 100 may generate image data IDATA corresponding to motion information or a motion image regardless of a mode selection signal MSEL. According to an example embodiment, the image sensor 100 may operate in a rolling shutter mode or a freeze frame shutter mode.

The light source 20 may emit an optical signal, which is modulated to the object 1 according to a control signal MLS of the light source driver 36, e.g., an infrared ray. According to an example embodiment, the light source 20 may emit an optical signal, which has less strength than the modulated optical signal and is not modulated, e.g., an infrared ray, to the object 1. That is, an intensity of an optical signal output from the light source 20 or whether the optical signal is modulated may be determined according to a control of the timing controller 30 operating according to the mode selection signal MSEL.

The infrared pass filter 22 may pass only an optical signal, which is emitted from the light source 20 and reflected from the object 1, through the pixel array 24. The pixel array 24 may include a plurality of unit pixels 26. Each of the plurality of unit pixels 26 is explained later in detail referring to FIGS. 3A through 5D. According to an example embodiment, each of the plurality of unit pixels 26 may be embodied in a TOF sensor pixel.

The readout circuit 28 may generate image data based on pixel signals output from the pixel array 24. The timing controller 30 may control components of the image sensor 100, e.g., the readout circuit 28, the clock generator 32, the row decoder 34, and/or the light source driver 36, based on a mode selection signal MSEL transmitted from the CPU 210.

The clock generator 32 may generate demodulation clock signals according to a control of the timing controller 30, and transmit generated demodulation clock signals to the pixel array 24. The demodulation clock signals are explained later in detail referring to FIGS. 3A through 5.

The row decoder 34 may decode a plurality of row control signals, e.g., row address signals, output from the timing controller 30, and drive a specific row line included in the pixel array 24 according to a decoding result. The row decoder 34 may include a row driver for driving the row line. The light source driver 36 may generate a control signal MLS for driving the light source 20 according to a control of the timing controller 30.

Figure 3A:
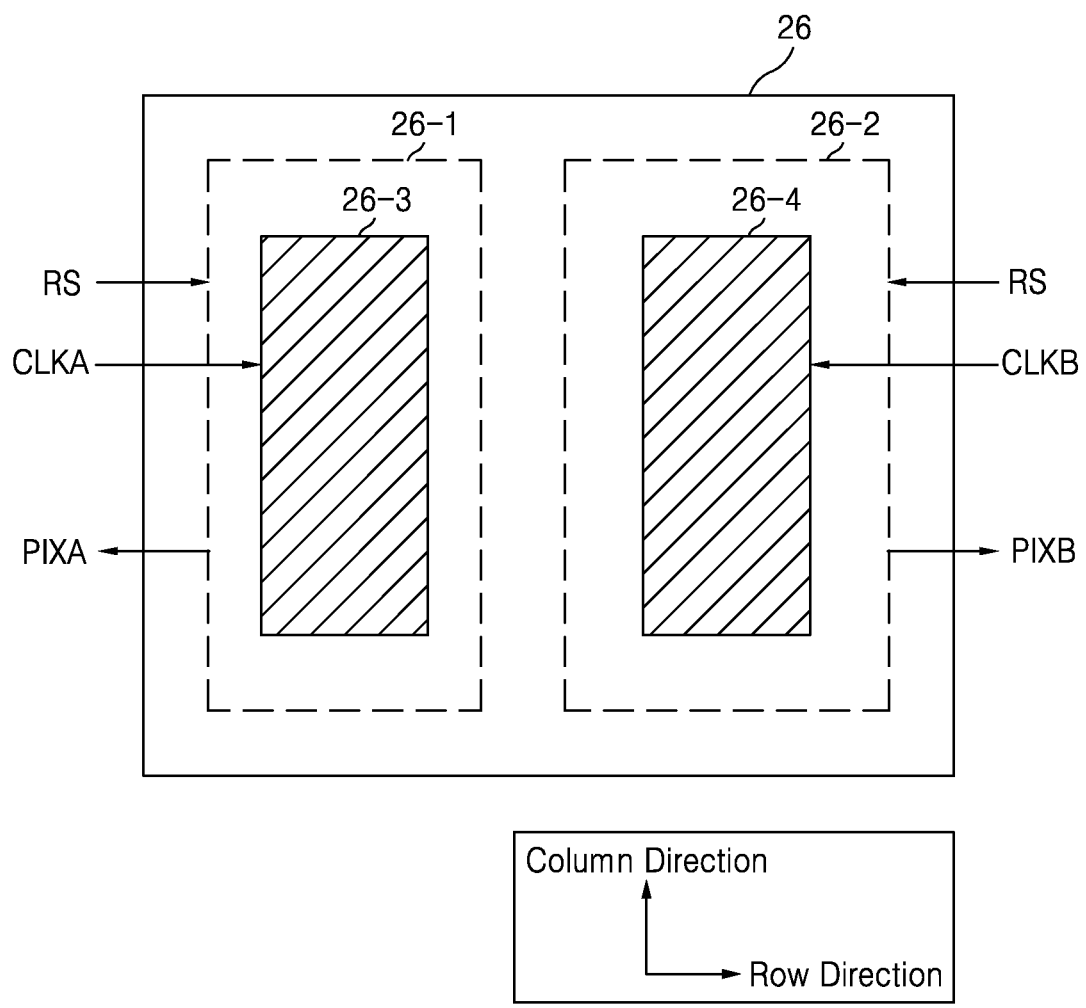
FIG. 3A is a drawing for explaining an example embodiment of a structure of a unit pixel illustrated in FIG. 2.

FIG. 3A is a drawing for explaining an example embodiment of a structure of a unit pixel illustrated in FIG. 2. Referring to FIGS. 2 and 3A, each unit pixel 26 may have a two-tap structure. Each unit pixel 26 of this example includes a first pixel 26-1 and a second pixel 26-2. Each of the pixels 26-1 and 26-2 includes an optical-electronic conversion element 26-3 and 26-4, respectively.

The first pixel 26-1 may receive a first demodulation clock signal CLKA for gating a first optical-electronic conversion element 26-3 and a reset signal RS for controlling a circuit included in the first pixel 26-1. The first pixel 26-1 may output a first pixel signal PIXA according to a reset signal RS and a first demodulation clock signal CLKA.

The second pixel 26-2 may receive a second demodulation clock signal CLKB for gating an optical-electronic conversion element 26-4 and a reset signal RS for controlling a circuit included in the second pixel 26-2. The second pixel 26-2 may output a second pixel signal PIXB according to a reset signal RS and a second demodulation clock signal CLKB.

The first pixel 26-1 and the second pixel 26-2 included in each unit pixel 26 may be adjacent to each other in a row direction. In this case, each unit pixel 26 may minutely sense a vertical edge or horizontal movement of the object 1.

Figure 3B:
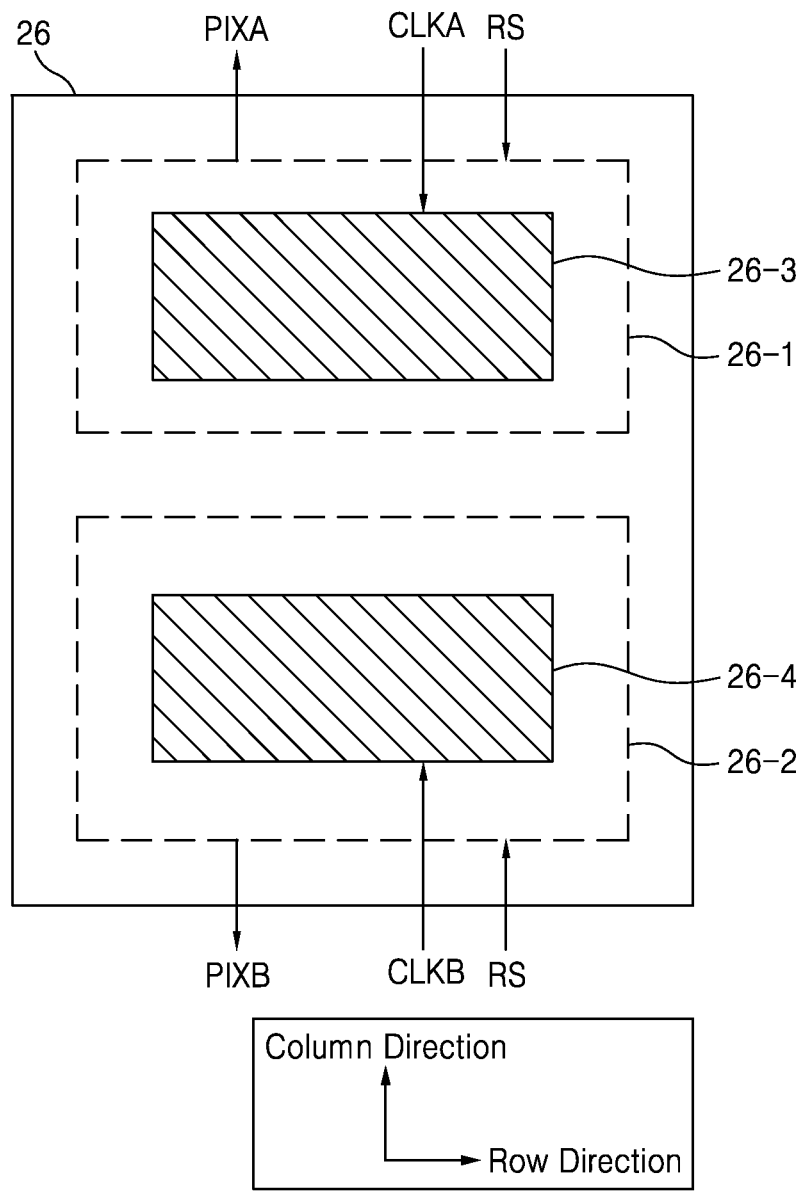
FIG. 3B is a drawing for explaining another example embodiment of the structure of the unit pixel illustrated in FIG. 2.

FIG. 3B is a drawing for explaining another example embodiment of the structure of the unit pixel illustrated in FIG. 2. Referring to FIGS. 2 and 3B, the first pixel 26-1 and the second pixel 26-2 included in each unit pixel 26 may be adjacent to each other in a column direction. In this case, each unit pixel 26 may minutely sense a horizontal edge or vertical movement of the object 1.

Figure 4:
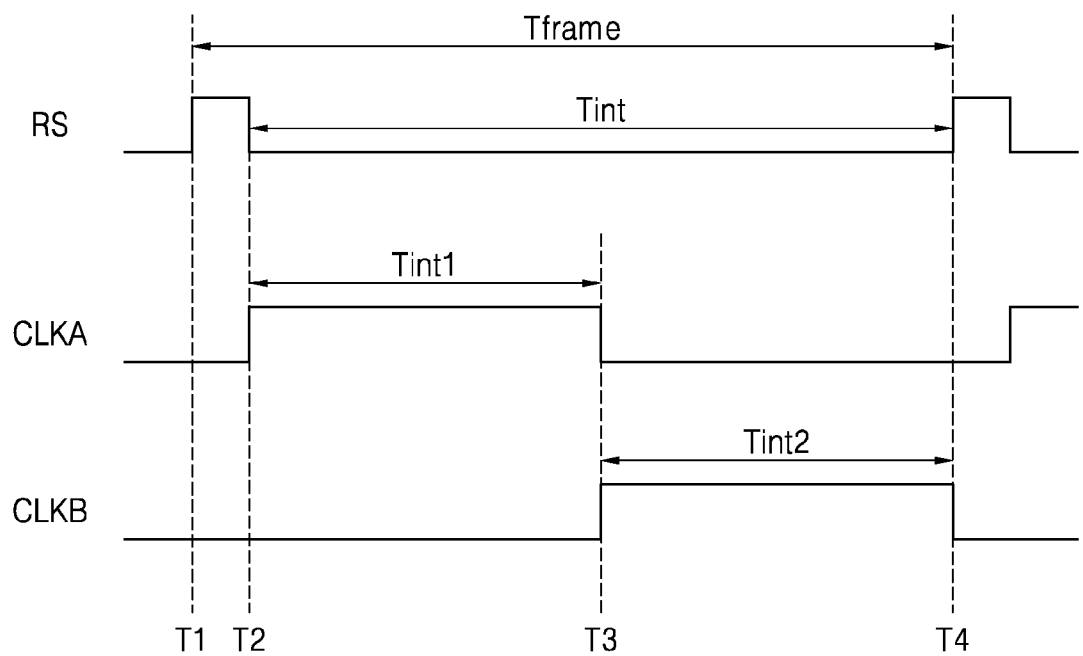
FIG. 4 is a timing diagram of control signals supplied to a unit pixel illustrated in FIG. 3A or 3B.
Figure 5A:
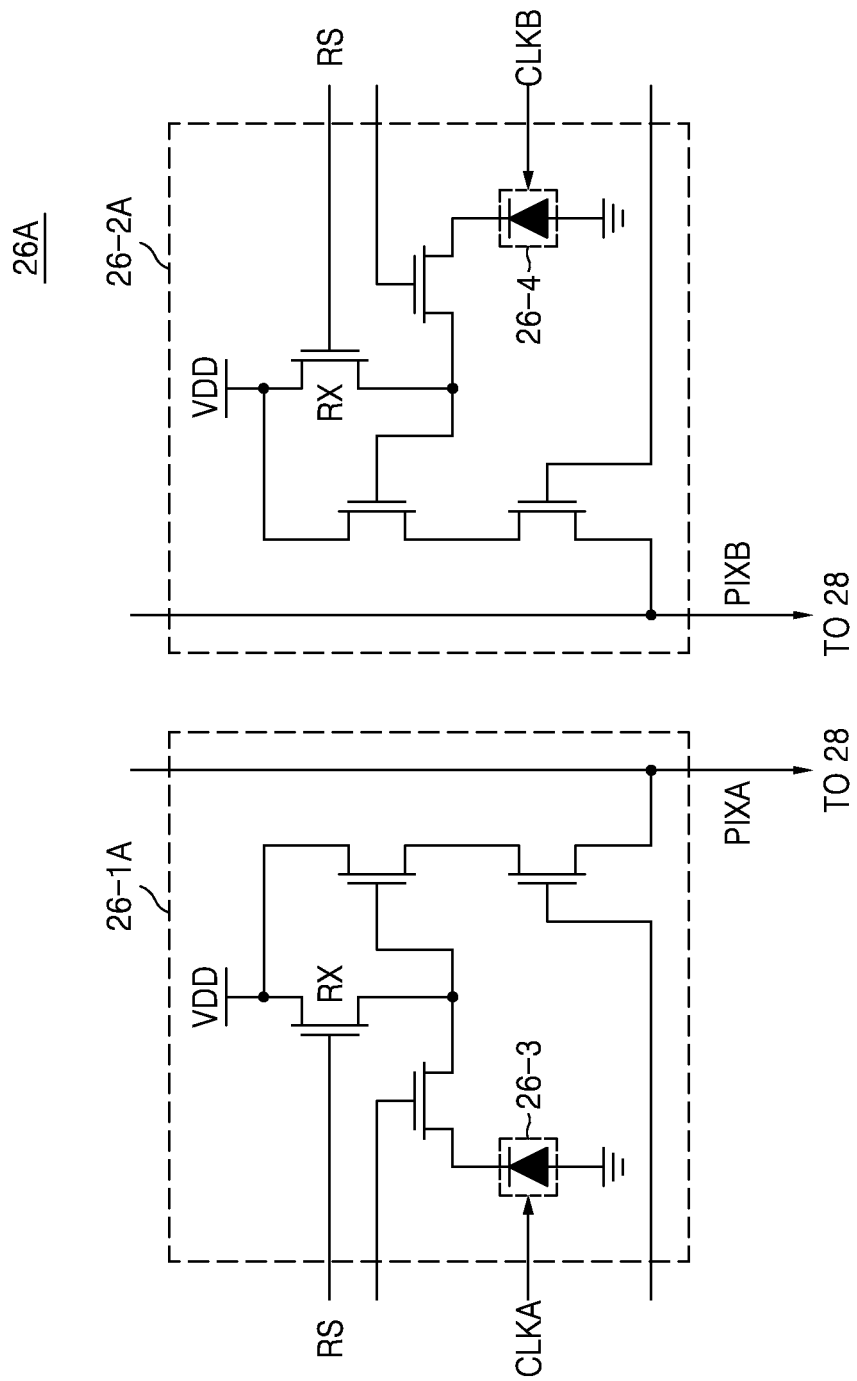
Figure 5B:
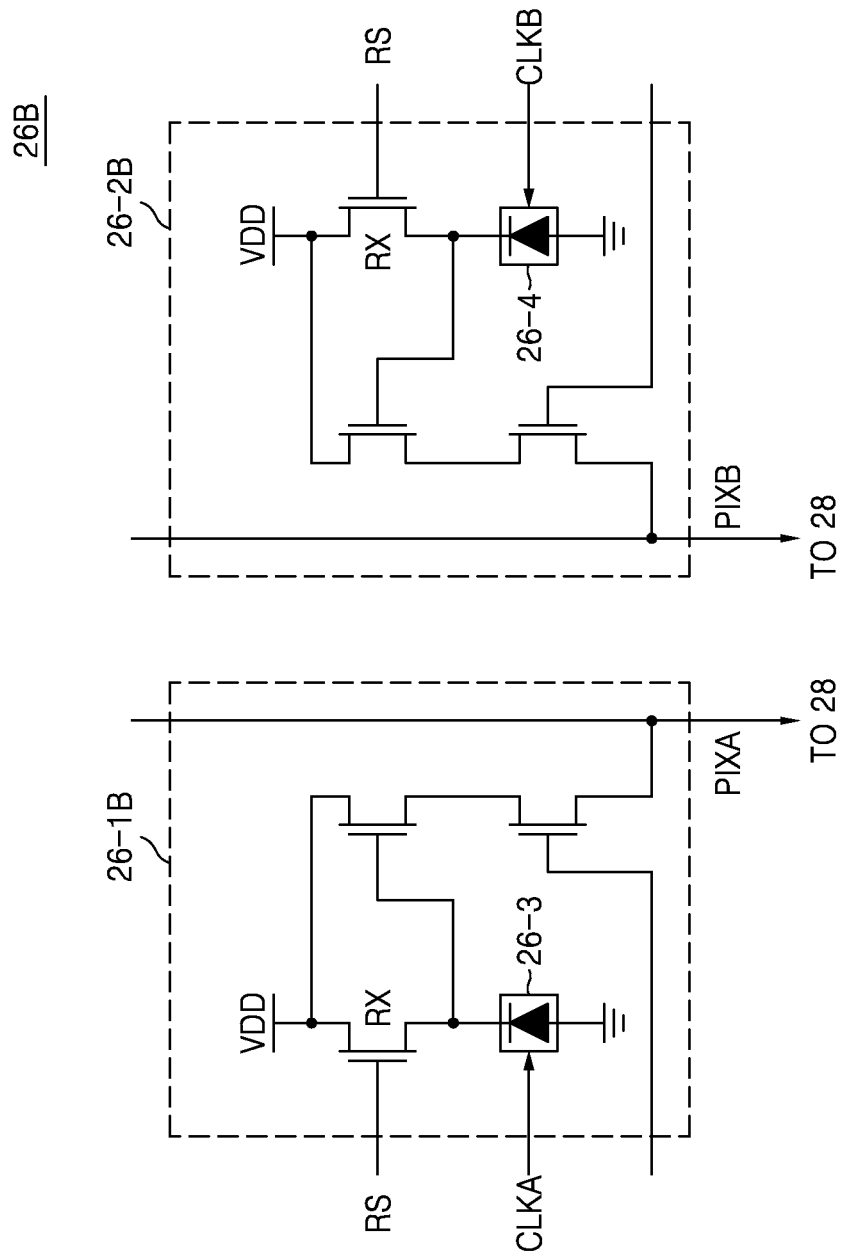
Figure 5D:
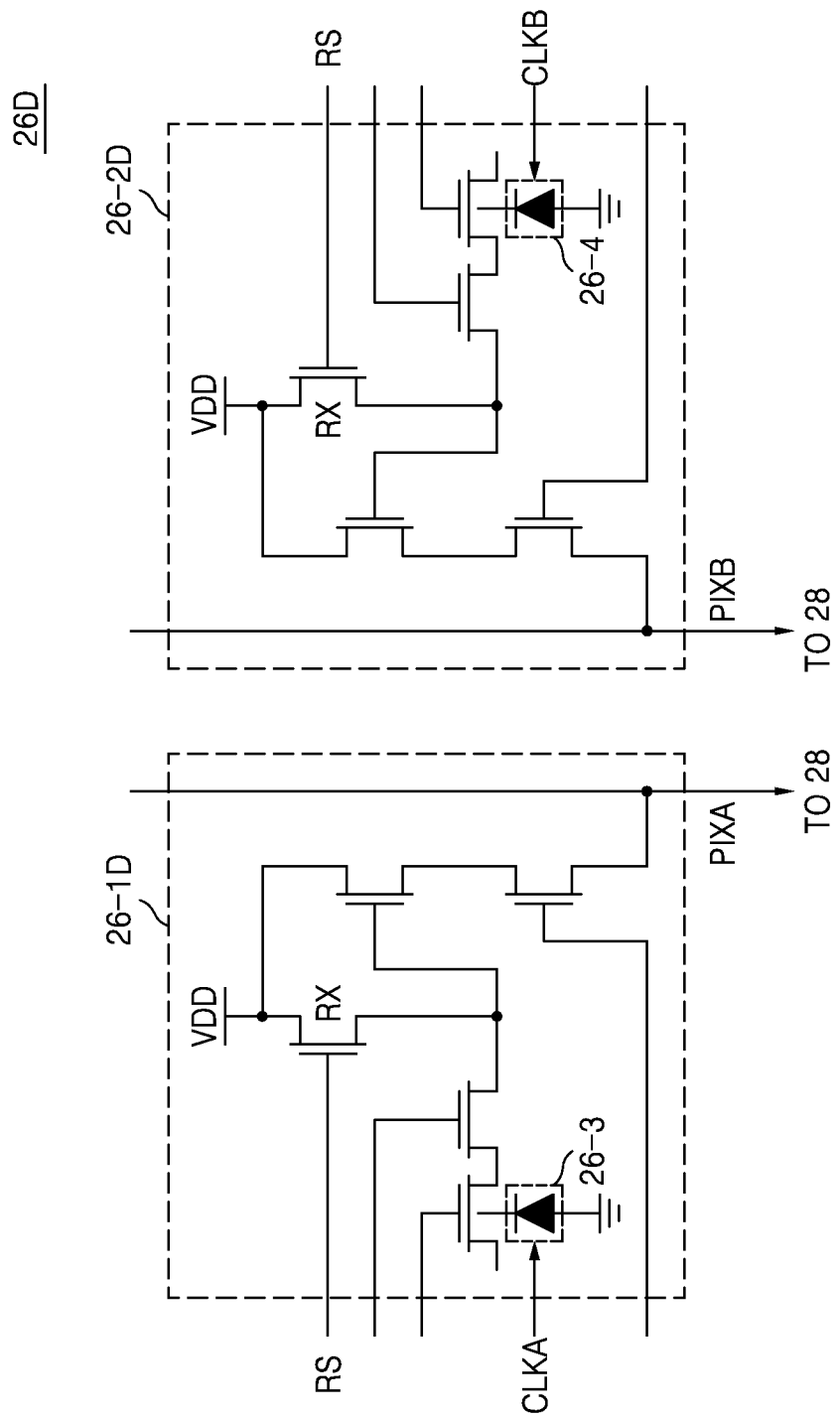

FIG. 4 is a timing diagram of control signals which may be supplied to the unit pixel illustrated in FIG. 3A or 3B. FIGS. 5A through 5D are example circuit diagrams of the unit pixel illustrated in FIG. 3A or 3B. Referring to FIGS. 4 through 5D, a reset signal RS may control a reset transistor RX included in each of a first pixel 26-1A through 26-1D and a second pixel 26-2A through 26-2D.

The reset signal RS is activated at a first time point T1, deactivated at a second time point T2, and activated again at a fourth time point T4. In this case, the time period extending from the first time point T1 to the fourth time point T4 corresponds to one frame, and this time period is referred to here as a frame period Tframe. The time period from the second time point T2 to the fourth time point T4 is an integration time Tint for pixels 26-1 and 26-2 included in each unit pixel 26 to execute optical-electronic conversion.

A first demodulation clock signal CLKA supplied to the first pixel 26-1 is activated at a second time point T2 when a reset signal RS becomes deactivated, and deactivated at a third time point T3 which is mid-point between the second time point T2 and the fourth time point T4. That is, a first integration time Tint1 when the first pixel 26-1 is activated corresponds to a first half section of integration time Tint.

A second demodulation clock signal CLKB supplied to the second pixel 26-2 is activated at a third time point T3 when the first demodulation clock signal CLKA is deactivated, and deactivated at the fourth time point T4. That is, a second integration time Tint2 when the second pixel 26-2 is activated corresponds to a second half section of the integration time Tint. The first integration time Tint1 and the second integration time Tint2 are included in one frame period.

Referring to FIGS. 5A through 5D, a reset transistor RX may reset a charge, which is generated from each of optical-electronic conversion elements 26-3 and 26-4, according to a reset signal RS.

Each of the optical-electronic conversion elements 26-3 and 26-4 may be embodied in a photo gate, and the photo gate may be gated according to a demodulation clock signal CLKA or CLKB. According to an example embodiment, each of the first pixel 26-1 and the second pixel 26-2 may be embodied in a pixel 26-1A or 26-2A having a four-transistor structure illustrated in FIG. 5A, a pixel 26-1B or 26-2B having a three-transistor structure illustrated in FIG. 5B, or a pixel 26-1C, 26-2C, 26-1D or 26-2D having a five-transistor structure illustrated in FIGS. 5C and 5D.

The first pixel 26-1A through 26-1D may output a first pixel signal PIXA and transmit the same to the readout circuit 28, according to a reset signal RS and a first demodulation clock signal CLKA. The second pixel 26-2A through 26-2D may output a second pixel signal PIXB and transmit the same to the readout circuit 28, according to a reset signal RS and a second demodulation clock signal CLKB.

Figure 6:
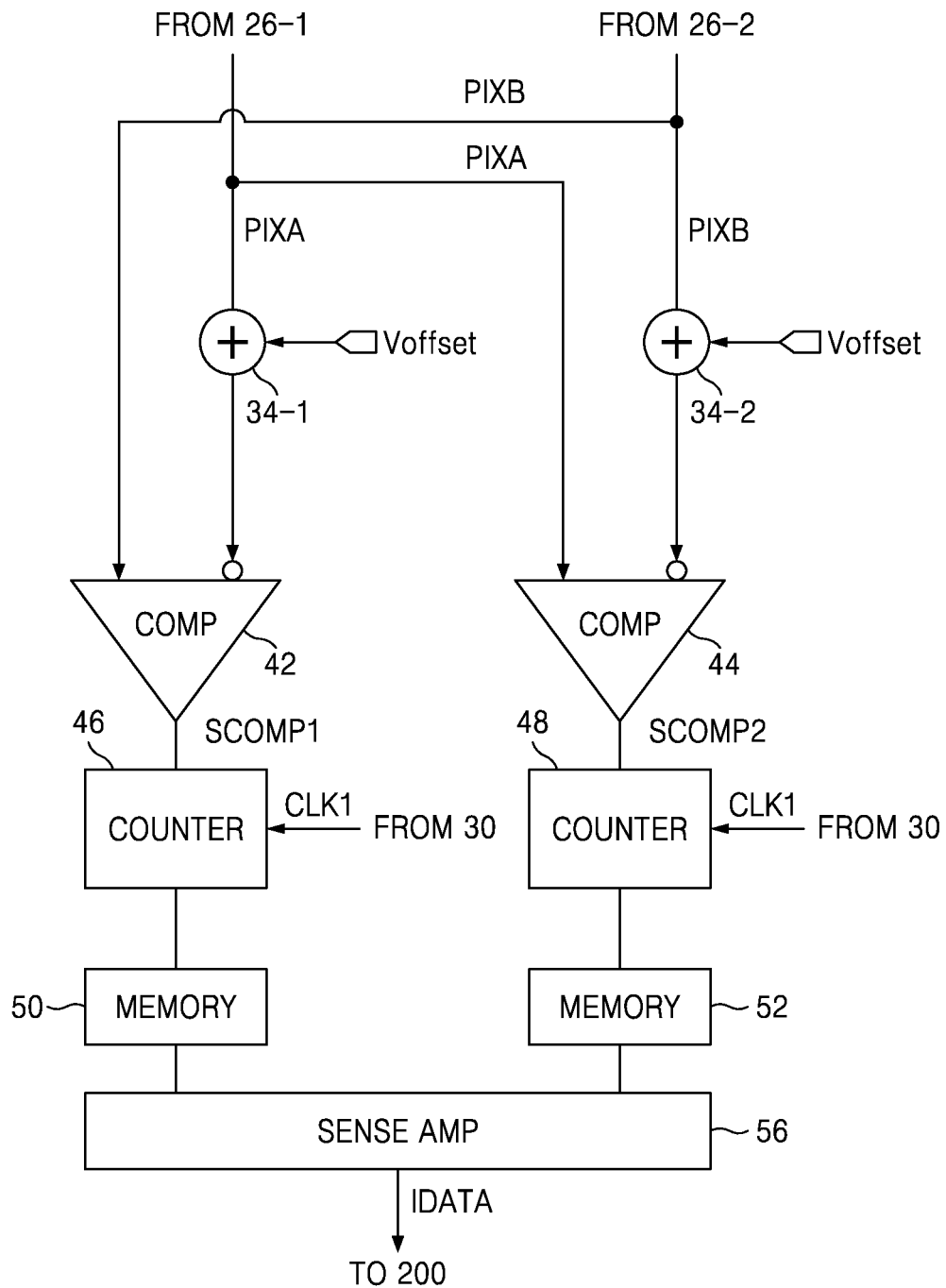
FIG. 6 is a circuit diagram according to an example embodiment of a read-out circuit illustrated in FIG. 2.
Figure 7:
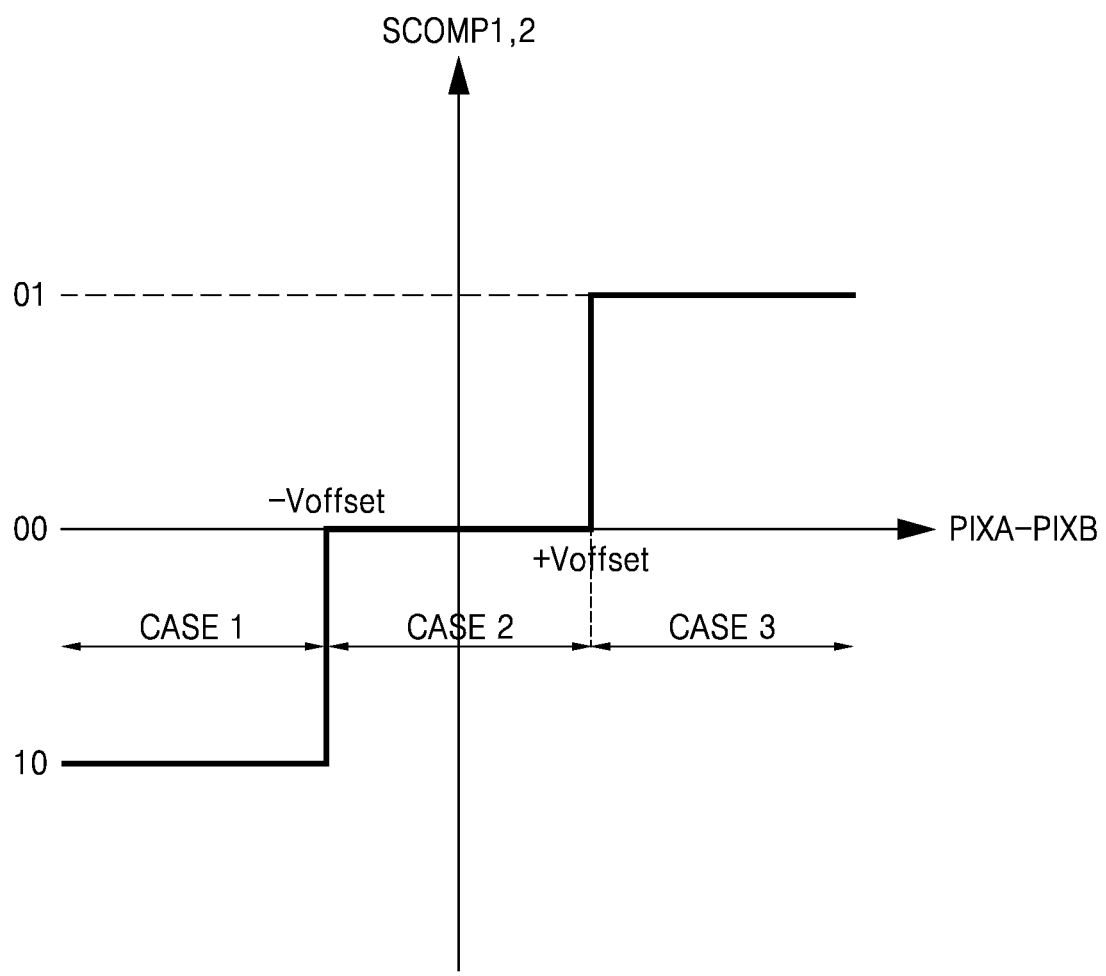
FIG. 7 is a drawing depicting a level of comparison signals illustrated in FIG. 6.

FIG. 6 is a circuit diagram according to an example embodiment of the read-out circuit illustrated in FIG. 2. FIG. 7 is a drawing depicting a level of comparison signals illustrated in FIG. 6. Referring to FIGS. 2, 6 and 7, the readout circuit 28 may include summation circuits 34-1 and 34-2, comparators 42 and 44, counters 46 and 48, memories 50 and 52, and a sense amplifier 56.

The summation circuit 34-1 may add a first pixel signal PIXA output from the first pixel 26-1 and an offset signal Voffset, and supply the resultant sum to an inverting terminal of a comparator 42. The comparator 42 may compare an output of the summation circuit 34-1 with a second pixel signal PIXB and output a comparison signal SCOMP1 according to a comparison result.

The summation circuit 34-2 may add the second pixel signal PIXB output from the second pixel 26-2 and the offset signal Voffset, and supply the resultant sum to an inverting terminal of a comparator 44. The comparator 44 may compare an output of the summation circuit 34-2 with the second pixel signal PIXB and output a comparison signal SCOMP2 according to a comparison result.

Referring to FIG. 7, when difference (PIXA-PIXB) between the first pixel signal PIXA and the second pixel signal PIXB is less than a negative offset signal −Voffset (CASE 1), the comparison signal SCOMP1 may be a second level, e.g., a high level or '1', and the comparison signal SCOMP2 may be a first level, e.g., a low level or '0'.

When the difference (PIXA-PIXB) between the first pixel signal PIXA and the second pixel signal PIXB is equal to or greater than the negative offset signal −Voffset and less than a positive offset signal +Voffset (CASE2), each of the comparison signal SCOMP1 and the comparison signal SCOMP2 is at a first level.

When the difference (PIXA-PIXB) between the first pixel signal PIXA and the second pixel signal PIXB is equal to or greater than the positive offset signal +Voffset (CASE 3), the comparison signal SCOMP1 may be at a first level and the comparison signal SCOMP2 may be at a second level. That is, referring to FIGS. 4, 6 and 7, comparators 42 and 44 compare the first pixel signal PIXA output by using the first pixel 26-1 during a first integration time Tint1 of one frame with the second pixel signal PIXB output by using the second pixel 26-2 during a second integration time Tint2 of the frame.

Each of the comparators 42 and 44 may output a comparison signal SCOMP1 having a value of '1' and a comparison signal SCOMP2 having a value of '0' when the first pixel signal PIXA is less than the second pixel signal PIXB (CASE 1) according to a comparison result, output a comparison signal SCOMP1 having a value of '0' and a comparison signal SCOMP2 having a value of '0' when the first pixel signal PIXA and the second pixel signal PIXB are equal in an error range, e.g., Voffset (CASE 2), and output a comparison signal SCOMP1 having a value of '0' and a comparison signal SCOMP2 having a value of '1' when the first pixel signal PIXA is greater than the second pixel signal PIXB (CASE 3).

The case 1 is a case where an amount of light sensed by a unit pixel 26 is increased during a time span, the case 2 is a case where an amount of light sensed by the unit pixel 26 is not changed during the time span, and the case 3 is a case where an amount of light sensed by the unit pixel 26 is decreased during the time span.

The readout circuit 28 may output e data IDATA corresponding to whether an amount of light sensed by the unit pixel 26 is changed during the time span, i.e., motion information or a motion image, according to a level of comparison signals SCOMP1 and SCOMP2 in each case CASE1 through CASE 3.

Each of counters 46 and 48 may count level a transition time of each of the comparison signals SCOMP1 and SCOMP2 in response to a clock signal CLK1. According to an example embodiment, a clock signal CLK1 may have a one clock cycle during a frame. In this case, each of the counters 46 and 48 may output each of the input comparison signals SOCMP1 and SCOMP2 as it is. The clock signal CLK1 is explained in detail referring to FIGS. 8 and 9.

According to an example embodiment, each of the counters 46 and 48 may be embodied as an up-down counter or a bit-wise inversion counter; however, the inventive concepts are not restricted thereto.

Memories 50 and 52 may temporarily store signals output from the counters 46 and 48, and output the signals to a sense amplifier 56. The sense amplifier 56 may sense & amplify signals output from the memories 50 and 52 and transmit them to an ISP 200 as image data IDATA.

Each of a data line connected from each comparator 42 or 44 to each counter 46 or 48, a data line connected from each counter 46 or 48 to each memory 50 or 52, and a data line connected from each memory 50 or 52 to the sense amplifier 56 may be embodied so that it may transmit one-bit data only. Accordingly, since an amount of data transmitted within the readout circuit 28 decreases, a data processing speed may be improved.

Figure 8:
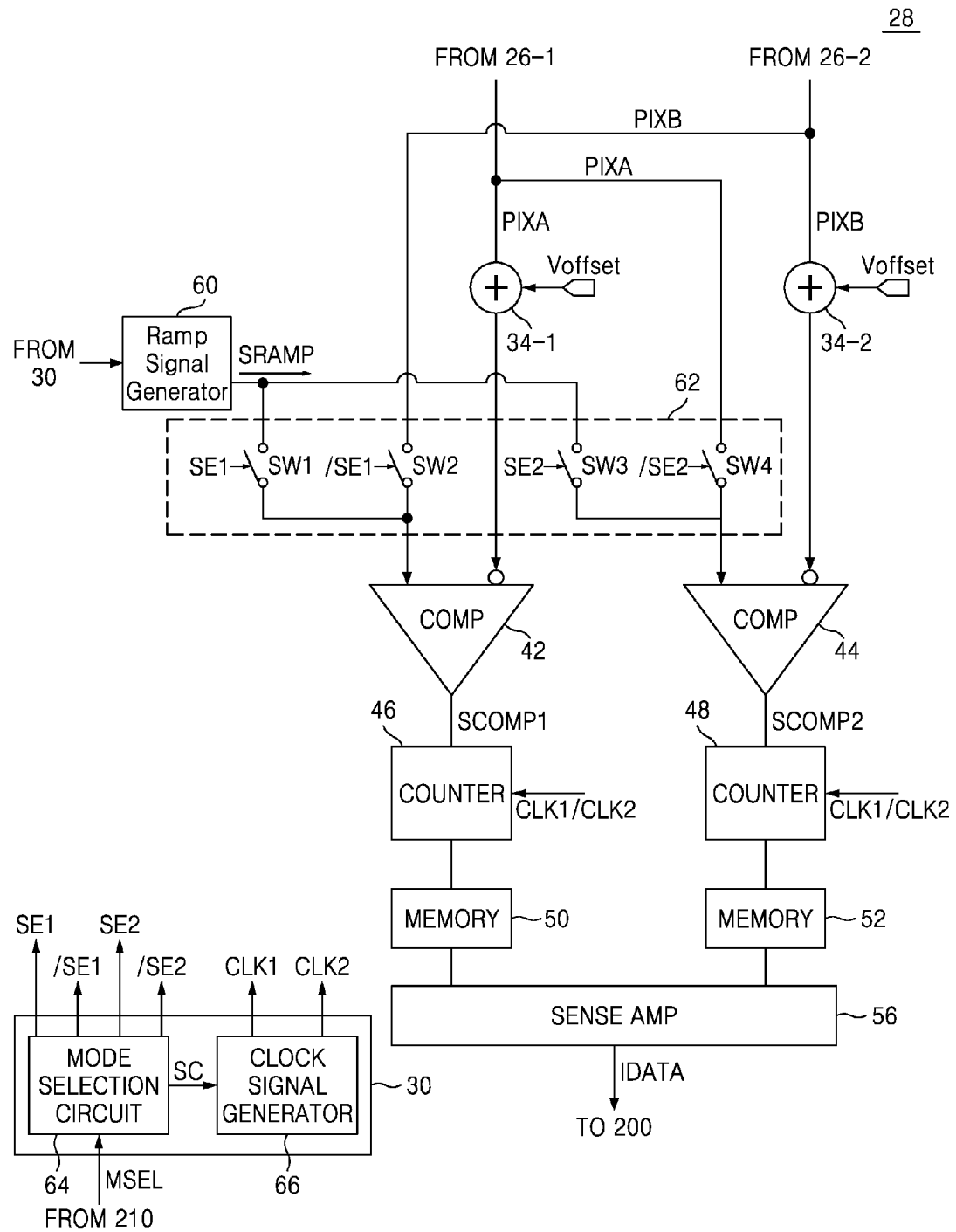
FIG. 8 is a circuit diagram according to another example embodiment of the read-out circuit illustrated in FIG. 2.
Figure 9:
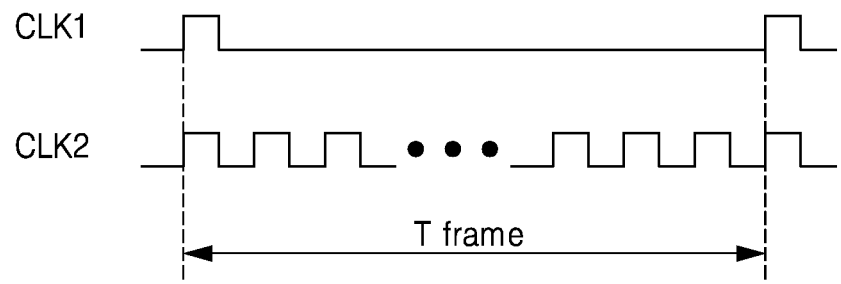
FIG. 9 is a drawing for explaining an example embodiment of clock signals illustrated in FIG. 8.

FIG. 8 is a circuit diagram according to another example embodiment of the readout circuit illustrated in FIG. 2. FIG. 9 is a drawing for explaining an example embodiment of clock signals illustrated in FIG. 8. For convenience of explanation, a timing controller 30 is illustrated along with the readout circuit 28 together.

Referring to FIGS. 2, 6, 8 and 9, the timing controller 30 may include a mode selection circuit 64 and a clock signal generator 66. According to an example embodiment, at least one of the mode selection circuit 64 and the clock signal generator 66 may be embodied outside the timing controller 30; however, the present inventive concepts are not limited to any particular layout of the mode selection circuit 64 and the clock signal generator 66.

The mode selection circuit 64 may generate a plurality of switching signals SE1, /SE1, SE2 and /SE2 based on a mode selection signal MSEL transmitted from the CPU 210. The mode selection circuit 64 may transmit a clock adjusting circuit CS to the clock signal generator 66 in response to the mode selection signal MSEL.

The clock signal generator 66 may generate a first clock signal CLK1 or a second clock signal CLK2 according to the clock adjusting signal CS. For example, the clock signal generator 66 may generate the first clock signal CLK1 when a level of the mode selection signal MSEL is a first level, e.g., a high level or '1', and generate the second clock signal CLK2 when a level of the mode selection signal MSEL is a second level, e.g., a low level or '0'.

Referring to FIG. 9, the first clock signal CLK1 may have a one clock cycle during a frame period Tframe of a frame, and the second clock signal CLK2 may have a plurality of clock cycles (e.g. 2 to the power of N cycles, where N is the ADC resolution) during the frame period Tframe.

According to an example embodiment, the clock signal generator 66 may generate the first clock signal CLK1 according to a control of the mode selection circuit 64 when an image sensor 100 of FIG. 2 operates as a motion sensor which may acquire motion information of an object, and may generate the second clock signal CLK2 according to a control of the mode selection circuit 64 when the image sensor 100 of FIG. 2 operates as a depth sensor which may acquire depth information of an object.

A readout circuit 28 of FIG. 8 may further include a ramp signal generator 60 and a switch array 62 in contrast to the readout circuit 28 of FIG. 6.

The ramp signal generator 60 may output a ramp signal SRAMP. According to an example embodiment, the ramp signal generator 60 may be embodied outside the readout circuit 28; however, the present inventive concepts are not limited by any particular layout of the ramp signal generator 60. The switch array 62 may transmit, in response to the switch signals SE1, /SE1, SE2, /SE2 transmitted from the mode selection circuit 64, the first pixel signal PIXA and one of the ramp signal SRAMP and the second pixel signal PIXB to the comparator 42 and transmit the second pixel signal PIXB and one of the ramp signal SRAMP and the first pixel signal PIXA to the comparator 44.

A switch signal SE1 and a switch signal /SE1 are signals are inverted relative to each other, and a switch signal SE2 and a switch signal /SE2 are inverted relative to each other.

According to an example embodiment, the switch array 62 has a switch SW1 turned on in response to a switch signal SE1, a switch SW2 turned off in response to a switch signal /SE1, a switch SW3 turned on in response to a switch signal SE2, and a switch SW4 turned off in response to a switch signal /SE2 when the image sensor 100 of FIG. 2 operates as a depth sensor which may acquire depth information of an object. In this case, each of the counters 46 and 48 may count an output of each of the comparators 42 and 44 in response to the second clock signal CLK2.

According to another example embodiment, the switch array 62 has a switch SW1 turned off in response to a switch signal SE1, a switch SW2 turned on in response to a switch signal /SE1, a switch SW3 turned off in response to a switch signal SE2, a switch SW4 turned on in response to a switch signal /SE2 when the image sensor 100 of FIG. 2 operates as a motion sensor which may acquire motion information of the object. In this case, each of the counters 46 and 48 may count an output of each of the comparators 42 and 44 in response to the first clock signal CLK1.

Figure 10:
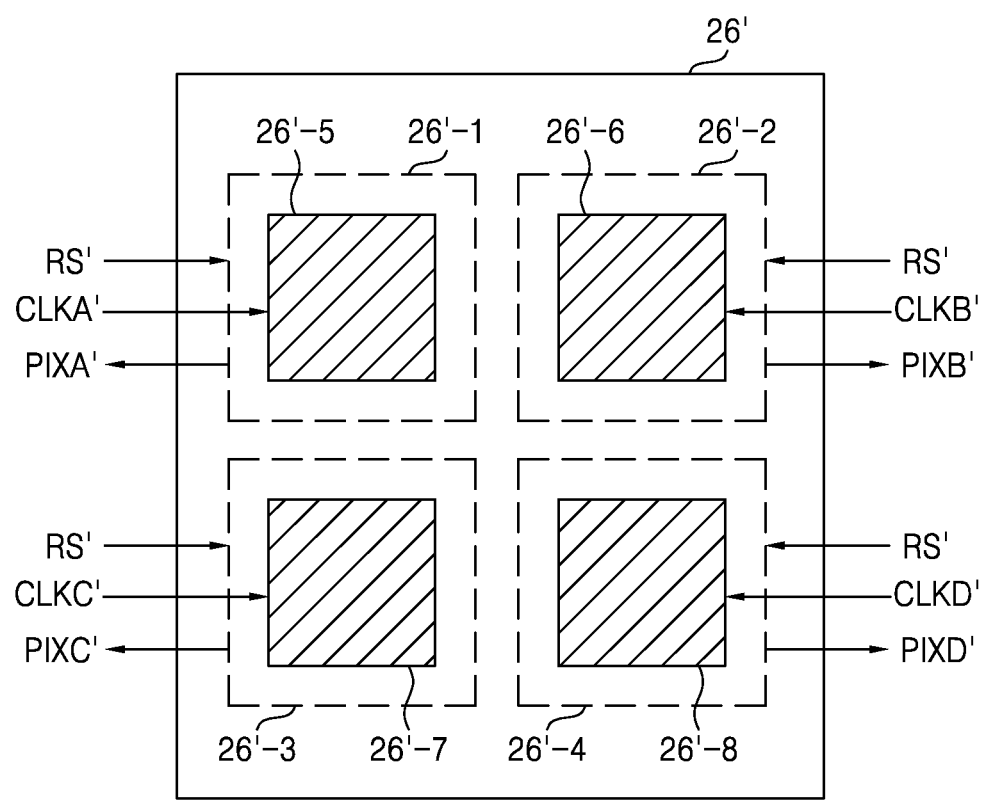
FIG. 10 is a drawing for explaining still another example embodiment of the structure of the unit pixel illustrated in FIG. 2.

FIG. 10 is a drawing for explaining still another example embodiment of the structure of the unit pixel illustrated in FIG. 2. Referring to FIGS. 2 and 10, a unit pixel 26' according to another example embodiment of each unit pixel 26 illustrated in FIG. 2 may have a four-tap structure. The unit pixel 26' includes a first pixel 26'-1, a second pixel 26'-2, a third pixel 26'-3, and a fourth pixel 26'-4. The pixels 26'-1 through 26'-4 includes optical electronic conversion elements 26'-5 through 26'-8, respectively.

A reset signal RS' may control a circuit included in each pixel 26'-1 through 26'-4. The optical electronic conversion element 26'-5 through 26'-8 may be gated by respective demodulation clock signal CLKA' through CLKD'.

Each pixel 26'-1 through 26'-4 may output each pixel signal PIXA' through PIXD' in response to the reset signal RS' and each demodulation clock signal CLKA' through CLKD'. A structure and an operation of each pixel 26'-1 through 26'-4 are substantially the same as a structure and an operation of each pixel 26-1 or 26-2 illustrated in FIG. 3a or 3b.

Figure 11:
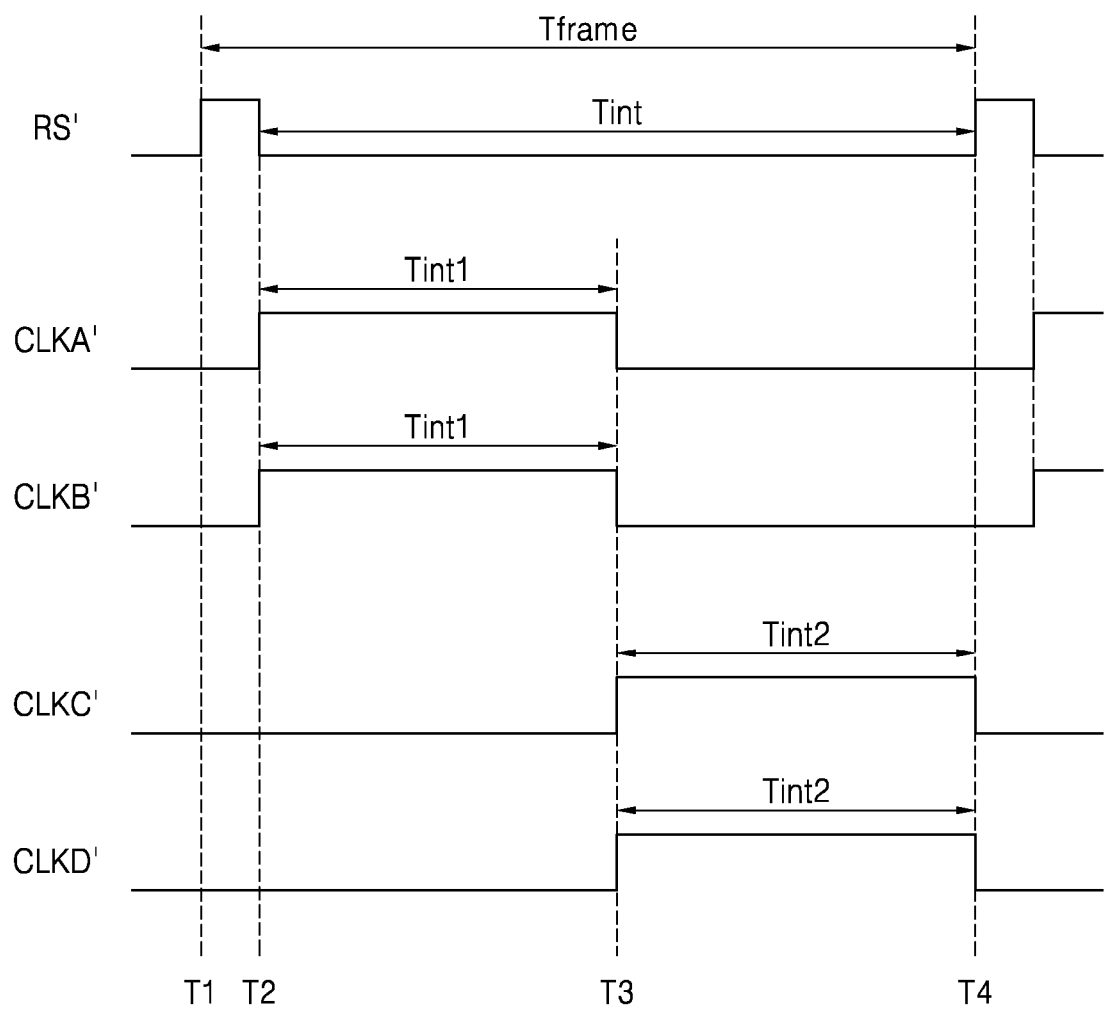
FIG. 11 is a timing diagram according to an example embodiment of control signals supplied to a unit pixel illustrated in FIG. 10.

FIG. 11 is a timing diagram according to an example embodiment of control signals supplied to the unit pixel illustrated in FIG. 1. Referring to FIGS. 10 and 11, the reset signal RS' may control a reset transistor included in each pixel 26'-1 through 26'-4.

The reset signal RS' is activated at a first time point T1 and deactivated at a second time point T2, and activated again at a fourth time point T4. In this case, the time period extending from the first time point T1 to the fourth time point T4 corresponds to a frame period Tframe. Additionally, the period from the second time point T2 to the fourth time point T4 is an integration time Tint for pixels 26'-1 through 26'-4 included in each unit pixel 26 to perform optical-electronic conversion.

A first demodulation clock signal CLKA' supplied to the first pixel 26'-1 and a second demodulation clock signal CLKB' supplied to a second pixel 26'-2 are activated at a second time point T2 when a reset signal RS becomes deactivated, and deactivated at a third time point T3, which is the mid point between the second time point T2 and the fourth time point T4. That is, a first integration time Tint1 when the first pixel 26'-1 and the second pixel 26'-2 are activated corresponds to a first half section of the integration time Tint.

A third demodulation clock signal CLKC' supplied to the third pixel 26'-3 and a fourth demodulation clock signal CLKD' supplied to the fourth pixel 26'-4 are activated at the third time point T3 and deactivated at the fourth time point T4. That is, a second integration time Tint2 when the third pixel 26'-3 and the fourth pixel 26'-4 are activated corresponds to a second half section of the integration time Tint.

The first integration time Tint1 and the second integration time Tint2 are included in one frame.

Figure 12:
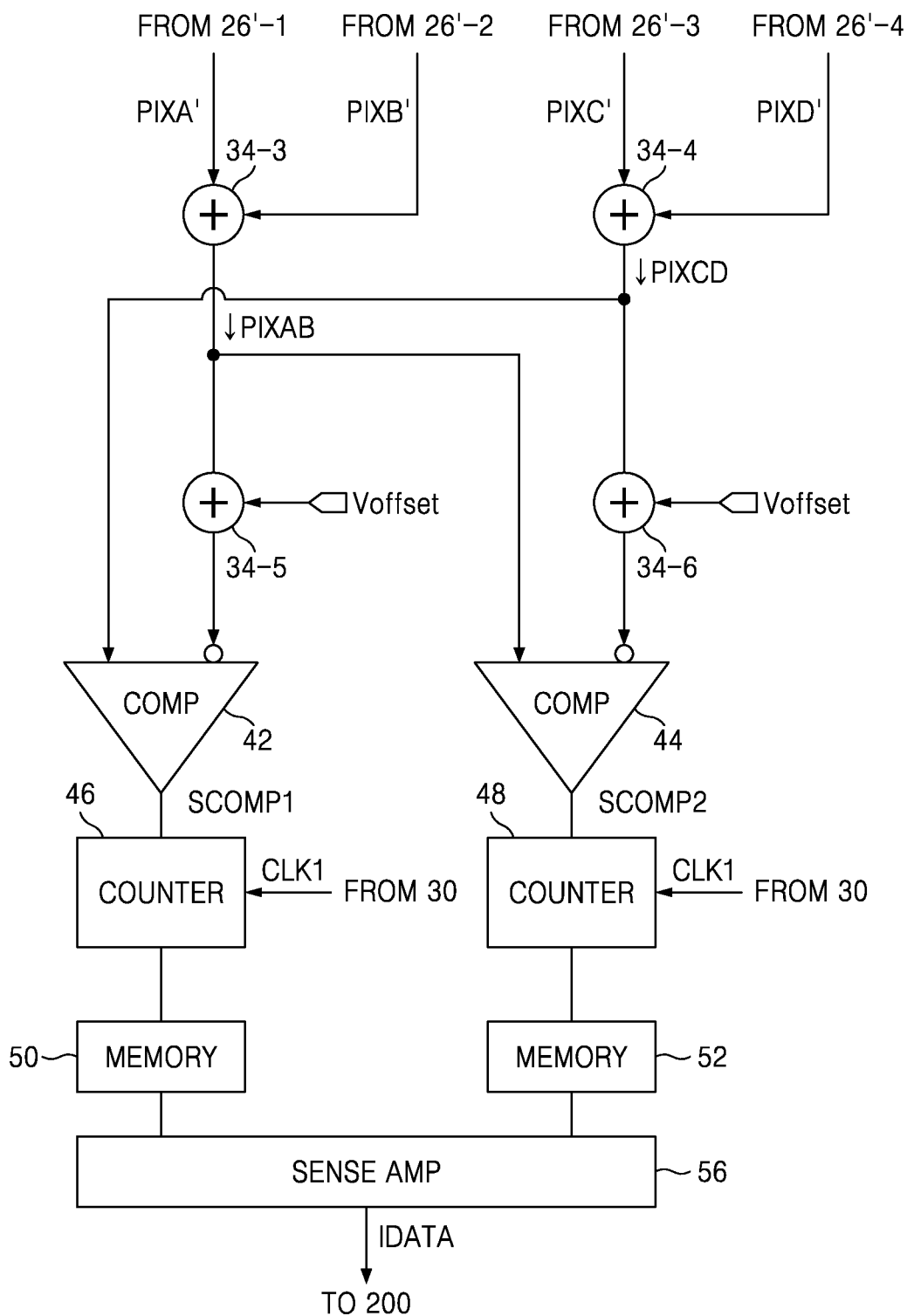
FIG. 12 is a circuit diagram of the read-out circuit illustrated in FIG. 2 to which the control signals of FIG. 11 are supplied.

FIG. 12 is a circuit diagram of the readout circuit illustrated in FIG. 2 to which control signals of FIG. 11 are supplied. Referring to FIGS. 6, 10 through 12, a readout circuit 28' according to an example embodiment of the readout circuit 28 illustrated in FIG. 2 may include summation circuits 34-3 through 34-6, comparators 42 and 44, counters 46 and 48, memories 50 and 52, and a sense amplifier 56.

An summation circuit 34-3 outputs a first sum signal PIXAB by adding a first pixel signal PIXA' output from the first pixel 26'-1 and a second pixel signal PIXB' output from the second pixel 26'-2. A summation circuit 34-4 outputs a second sum signal PIXCD by adding a third pixel signal PIXC' output from the third pixel 26'-3 and a fourth pixel signal PIXD' output from the fourth pixel 26'-4. A summation circuit 34-5 adds an offset signal Voffset to the first sum signal PIXAB and transmits it to a non-inverting terminal of the comparator 42, and a summation circuit 34-6 adds an offset signal Voffset to the second sum signal PIXCD and transmits it to a non-inverting terminal of the comparator 44.

In other words, the readout circuit 28' may output image data IDATA corresponding to whether an amount of light sensed by the unit pixel 26' is changed or not during a given time period, i.e., motion information or a motion image of an object, according to a result of comparing the first sum signal PIXAB corresponding to the sum of the first pixel signal PIXA' output from the first pixel 26'-1 and the second pixel signal PIXB' output from the second pixel 26'-2 with the second sum signal PIXCD corresponding to the sum of the third pixel signal PIXC' output from the third pixel 26'-3 and the fourth pixel signal PIXD' output from the fourth pixel 26'-4.

In this case, each unit pixel 26' may closely sense a horizontal edge or vertical movement of the object (1 of FIG. 2).

Except for including the summation circuit 34-3, which adds and outputs the first pixel signal PIXA' output from the first pixel 26'-1 and the second pixel signal PIXB' output from the second pixel 26'-2, and the summation circuit 34-4, which adds and outputs the third pixel signal PIXC' output from the third pixel 26'-3 and the fourth pixel signal PIXD' output from the fourth pixel 26'-4, the readout circuit 28' is substantially the same as the readout circuit 28 of previously described FIG. 6.

Figure 13:
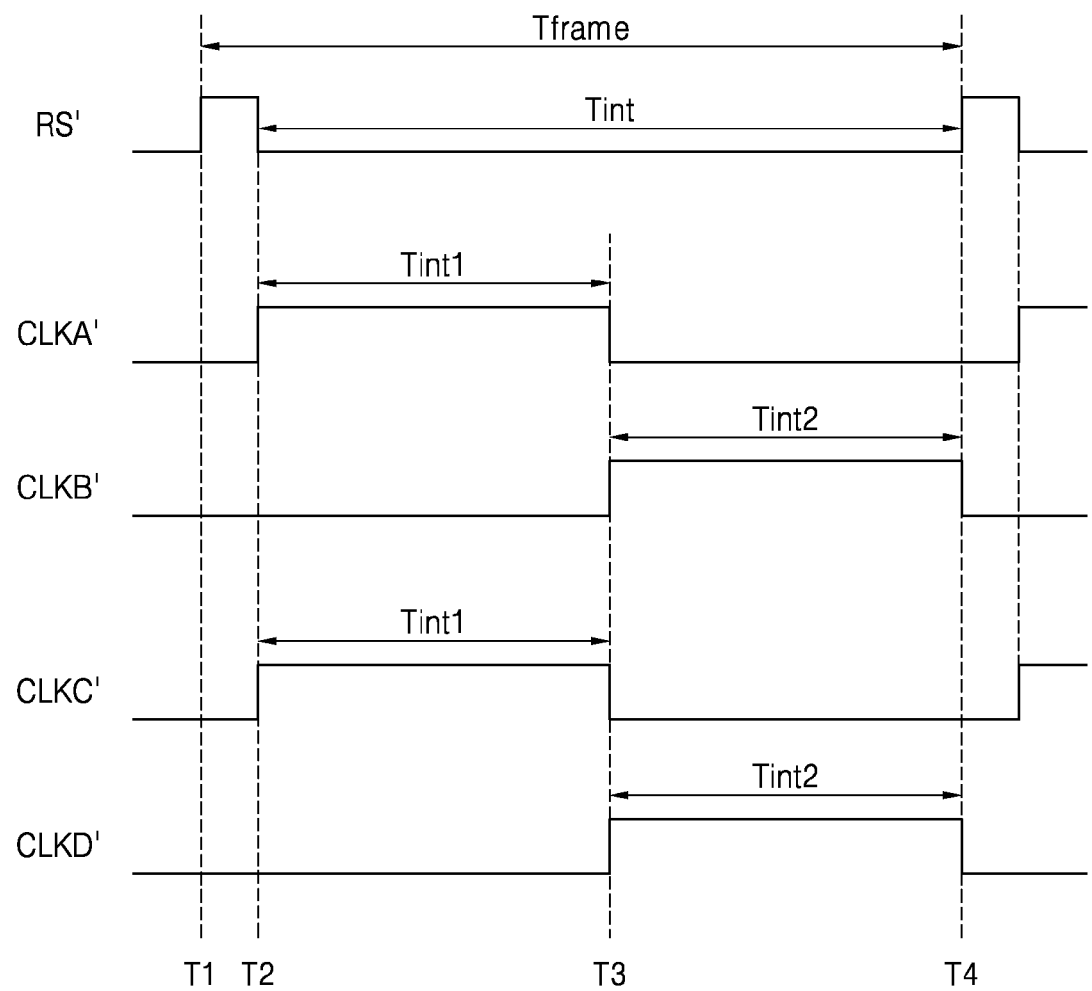
FIG. 13 is a timing diagram according to another example embodiment of control signals supplied to the unit pixel illustrated in FIG. 10.
Figure 14:
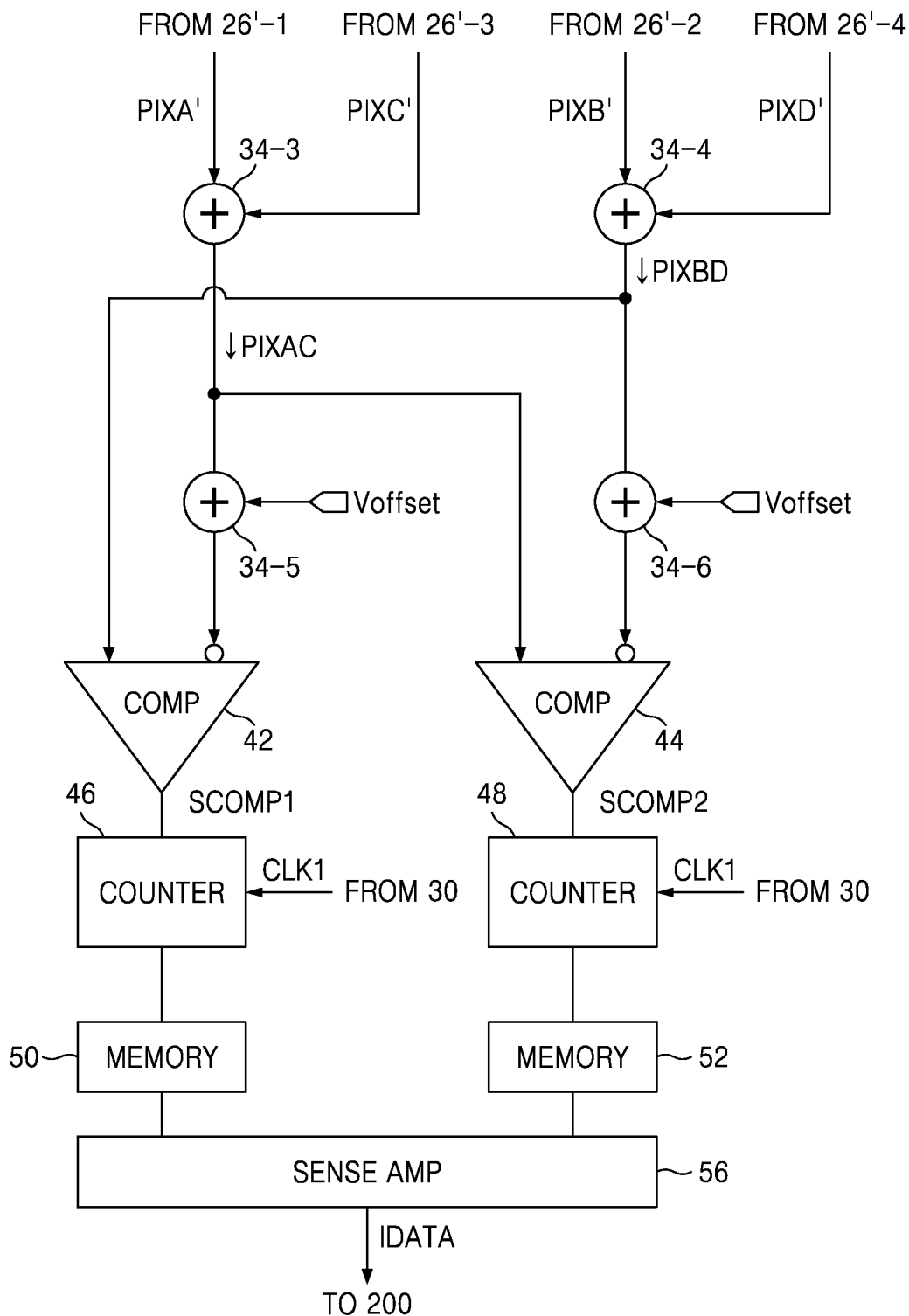
FIG. 14 is a circuit diagram of the read-out circuit illustrated in FIG. 2 to which control signals of FIG. 13 are supplied.

FIG. 13 is a timing diagram according to another example embodiment of control signals supplied to the unit pixel illustrated in FIG. 10. FIG. 14 is a circuit diagram of the readout circuit illustrated in FIG. 2 to which the control signals illustrated in FIG. 13 are supplied. Referring to FIGS. 10 through 14, the first demodulation clock signal CLKA' and the third demodulation clock signal CLKC' are activated during a first integration time Tint1, and the second demodulation clock signal CLKB' and the fourth demodulation clock signal CLKD' are activated during a second integration time Tint2.

In this case, the summation circuit 34-3 included in the readout circuit 28' according to an example embodiment of the readout circuit 28 of FIG. 2 outputs a first sum signal PIXAC by adding the first pixel signal PIXA' output from the first pixel 26'-1 and the third pixel signal PIXC' output from the third pixel 26'-3.

The summation circuit 34-4 outputs a second sum signal PIXBD by adding the second pixel signal PIXB' output from the second pixel 26'-2 and the fourth pixel signal PIXD' output from the fourth pixel 26'-4. An summation circuit 34-5 adds an offset signal Voffset to the first sum signal PIXAC and transmits it to a non-inverting terminal of the comparator 42, and an summation circuit 34-6 adds an offset signal Voffset to the second sum signal PIXBD and transmits it to a non-inverting terminal of the comparator 44.

That is, the readout circuit 28' may output image data IDATA corresponding to whether an amount of light sensed by the unit pixel 26' is changed during a given time period, i.e., motion information or a motion image of an object, according to a result of comparing the first sum signal PIXAC corresponding to the sum of the first pixel signal PIXA' output from the first pixel 26'-1 and the third pixel signal PIXC' output from the third pixel 26'-3 with the second sum signal PIXBD corresponding to the sum of the second pixel signal PIXB' output from the second pixel 26'-2 and the fourth pixel signal PIXD' output from the fourth pixel 26'-4. In this case, each unit pixel 26' may closely sense vertical edge or horizontal movement of the object (1 of FIG. 2).

Figure 15:
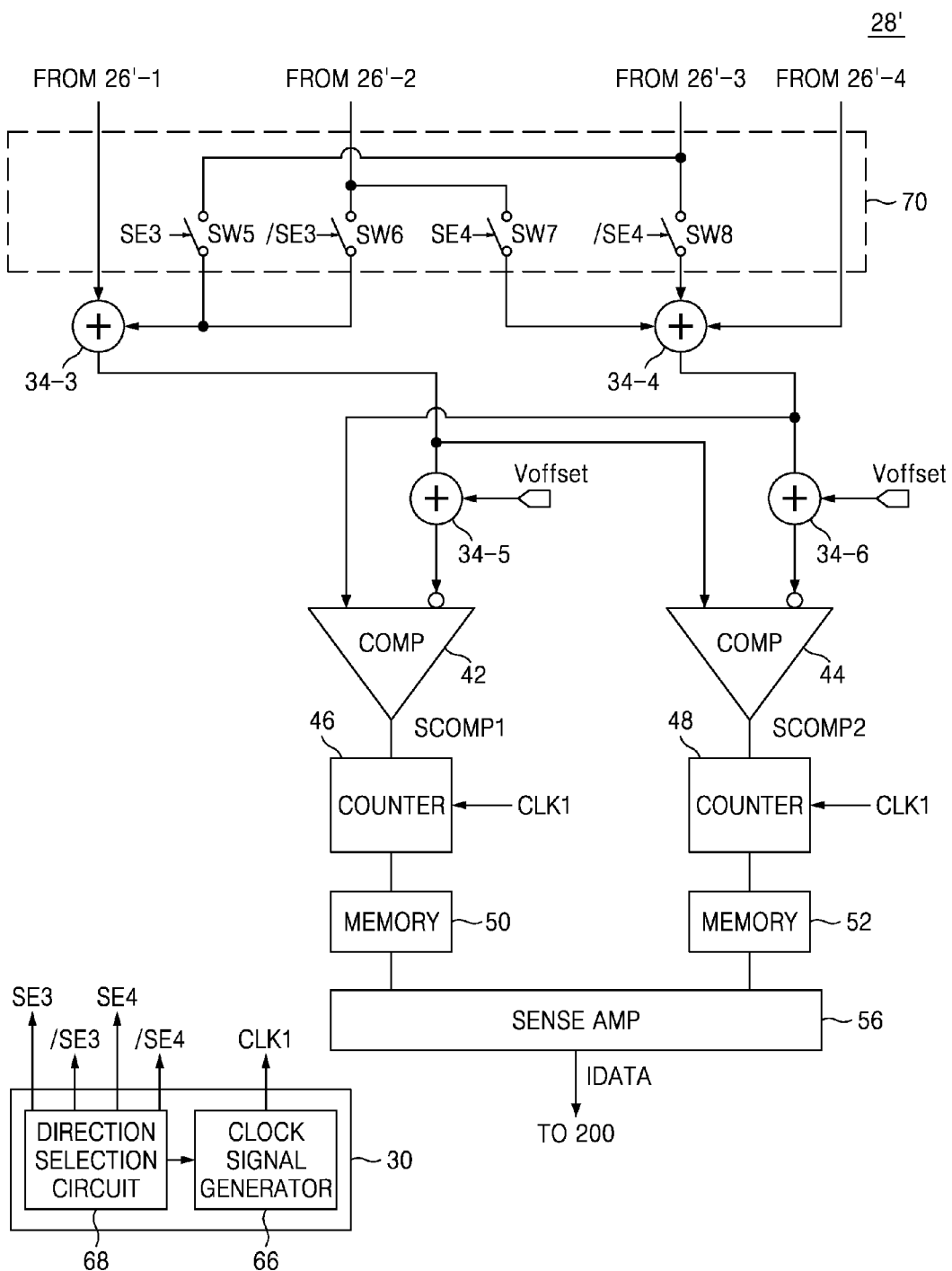
FIG. 15 is a circuit diagram of the read-out circuit illustrated in FIG. 2 to which the control signals of FIG. 11 or 13 are supplied.

FIG. 15 is a circuit diagram of the readout circuit illustrated in FIG. 2 to which the control signals of FIG. 11 or 13 are supplied. For convenience of explanation, the timing controller 30 is illustrated together with the readout circuit 28'.

Referring to FIGS. 10 through 15, the timing controller 30 may include a clock signal generator 66 and a direction selecting circuit 68.

The clock signal generator 66 may generate a clock signal CLK1 supplied to each of the counter 46 and 48. The direction selecting circuit 68 may output switch signals SE3, /SE3, SE5 and /SE4 for switching a plurality of switches SW5 through SW8 included in a switch array 70. According to an example embodiment, the direction selecting circuit 68 may be controlled by the CPU (210 of FIG. 1).

A switch signal SE3 and a switch signal /SE3 are complementary signals to each other, and a switch signal SE4 and a switch signal /SE4 are complementary signals to each other. The switch array 70 may include a plurality of switches SW5 through SW8.

According to an example embodiment, a switch SW5 may be turned off in response to the switch signal SE3, a switch SW6 may be turned on in response to the switch signal /SE3, a switch SW7 may be turned off in response to the switch signal SE4, and a switch SW8 may be turned on in response to the switch signal /SE4. In this case, the readout circuit 28' of FIG. 1 may operate substantially the same as the readout circuit 28' of FIG. 12. According to another example embodiment, a switch SW5 may be turned on in response to the switch signal SE3, a switch SW6 may be turned off in response to the switch signal /SE3, a switch SW7 may be turned on in response to the switch signal SE4, and a switch SW8 may be turned off in response to the switch signal /SE4. In this case, the readout circuit 28' of FIG. 15 may operate substantially the same as the readout circuit 28' of FIG. 14.

Figure 16:
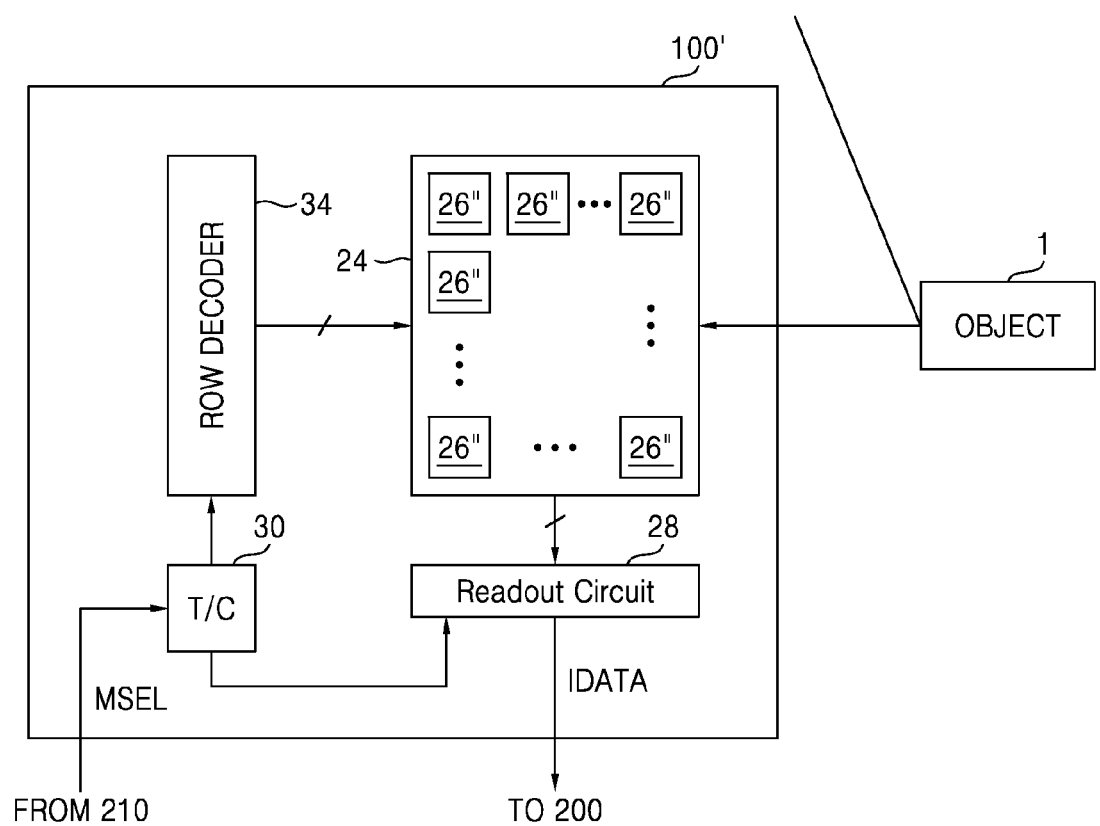
FIG. 16 is a block diagram according to another example embodiment of the image sensor illustrated in FIG. 1.

FIG. 16 is a block diagram according to another example embodiment of the image sensor illustrated in FIG. 1. For convenience of explanation, the object 1 is illustrated with the image sensor 100 together. Referring to FIGS. 1, 2 and 16, an image sensor 100' according to another example embodiment of the image sensor illustrated in FIG. 1 may include a pixel array 24, a readout circuit 28, a timing controller 30 and a row decoder 34.

The pixel array 24 may include a plurality of unit pixels 26'', and each unit pixel 26'' may be embodied in an image sensor pixel, e.g., a color pixel, according to an example embodiment. The image sensor 100 may get image data IDATA corresponding to color information or a color image of the object 1 or image data corresponding to motion information or a motion image of the object 1 according to a motion selection signal MSEL.

Figure 17:
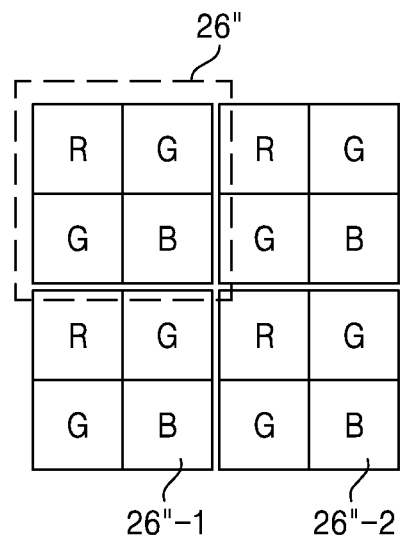
FIG. 17 is a drawing depicting an example embodiment of layout of pixels which are comparative targets in a pixel array illustrated in FIG. 16.
Figure 18:
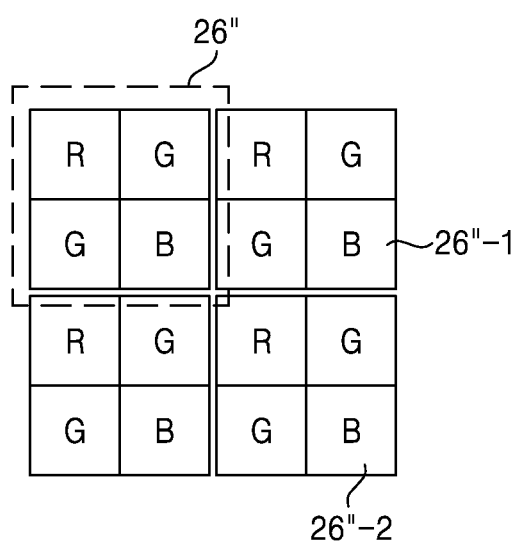
FIG. 18 is a drawing depicting another example embodiment of the layout of the pixels which are comparative targets in the pixel array illustrated in FIG. 16.
Figure 19:
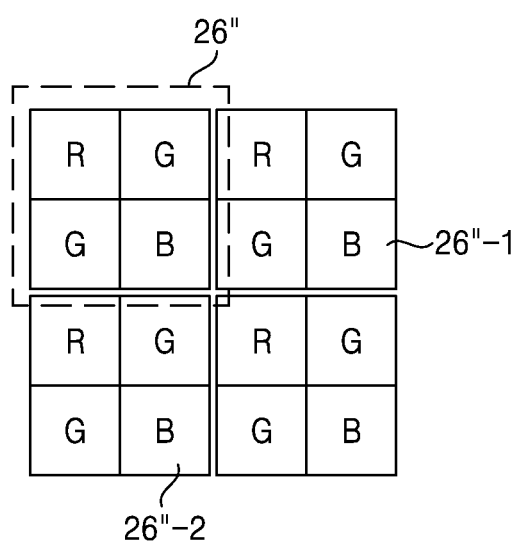
FIG. 19 is a drawing depicting still another example embodiment of the layout of the pixels which are comparative targets in the pixel array illustrated in FIG. 16.

FIG. 17 is a drawing depicting an example embodiment of layout of pixels which are comparative targets in the pixel array illustrated in FIG. 16. FIG. 18 is a drawing depicting another example embodiment of the layout of pixels which are comparative targets in the pixel array illustrated in FIG. 16. FIG. 19 is a drawing depicting still another example embodiment of the layout of pixels which are comparative targets in the pixel array illustrated in FIG. 16.

For convenience of explanation, a part 24-1A through 24-1C of the pixel array 24 is illustrated. Referring to FIGS. 16 through 19, a first pixel 26''-1 and a second pixel 26''-2 which are comparative targets are color pixels which have the same color, e.g., red, green or blue, and may be included in each of adjacent unit pixels.

The first pixel 26''-1 and the second pixel 26''-2 illustrated in FIG. 17 are included in each of adjacent unit pixels in a row direction. The first pixel 26''-1 and the second pixel 26''-2 illustrated in FIG. 18 are included in each of adjacent unit pixels in a column direction. The first pixel 26''-1 and the second pixel 26''-2 illustrated in FIG. 19 are included in each of adjacent unit pixels in a diagonal direction.

Figure 20:
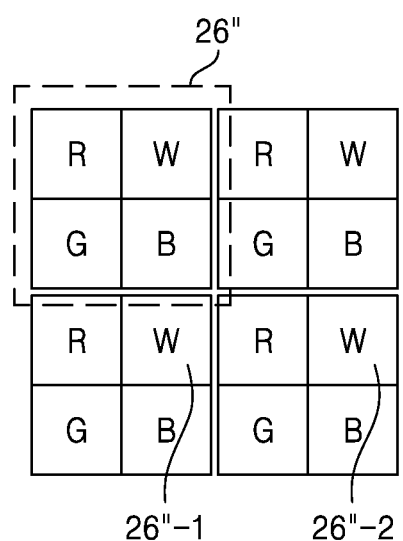
FIG. 20 is a drawing depicting still another example embodiment of the layout of the pixels which are comparative targets in the pixel array illustrated in FIG. 16.
Figure 21:
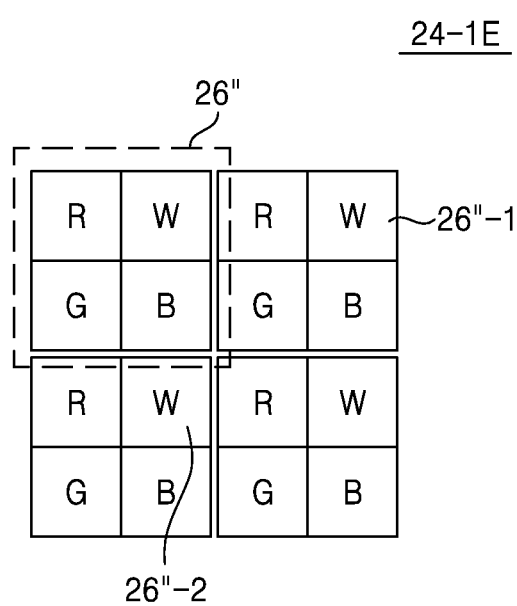
FIG. 21 is a drawing depicting still another example embodiment of the layout of the pixels which are comparative targets in the pixel array illustrated in FIG. 16.

FIG. 20 is a drawing depicting still another example embodiment of the layout of pixels which are comparative targets in the pixel array illustrated in FIG. 16. FIG. 21 is a drawing depicting still another example embodiment of the layout of pixels which are comparative targets in the pixel array illustrated in FIG. 16. For convenience of explanation, a part 24-1D or 24-1E of the pixel array 24 is illustrated. Referring to FIGS. 20 and 21, the unit pixel 26'' may include a white pixel.

According to an example embodiment, the first pixel 26''-1 and the second pixel 26''-2 which are comparative targets are white pixels and may be included in each of adjacent unit pixels. According to an example embodiment, a part 24-1D or 24-1E of the pixel array 24 may includes IR-pass filter correspond to each of white pixels.

The first pixel 26''-1 and the second pixel 26''-2 illustrated in FIG. 20 are included in each of adjacent unit pixels in a row direction. The first pixel 26''-1 and the second pixel 26''-2 illustrated in FIG. 21 are included in each of adjacent unit pixels in a diagonal direction. According to another example embodiment, the first pixel 26''-1 and the second pixel 26''-2 may be included in each of adjacent unit pixels in a column direction.

Figure 22:
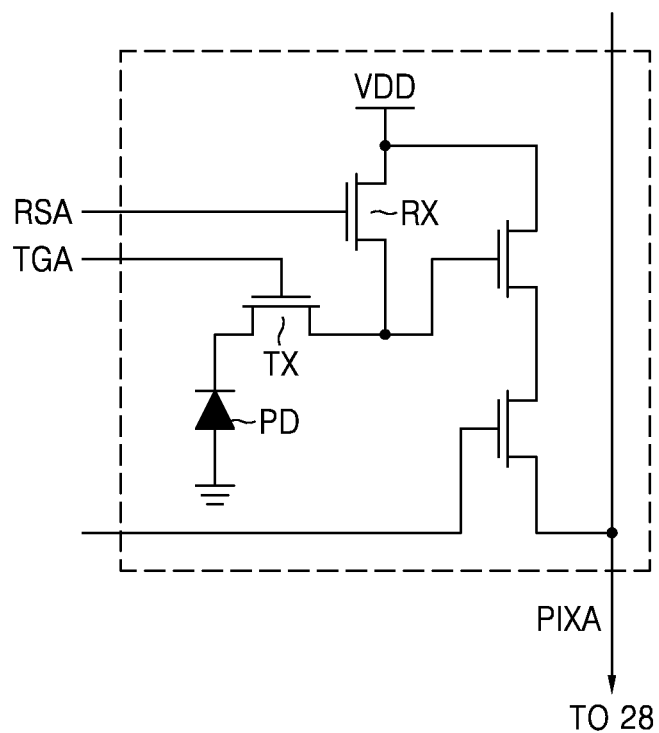
FIG. 22 is a circuit diagram of one of pixels which are comparative targets in the pixel array illustrated in FIGS. 18 through 21.
Figure 23:
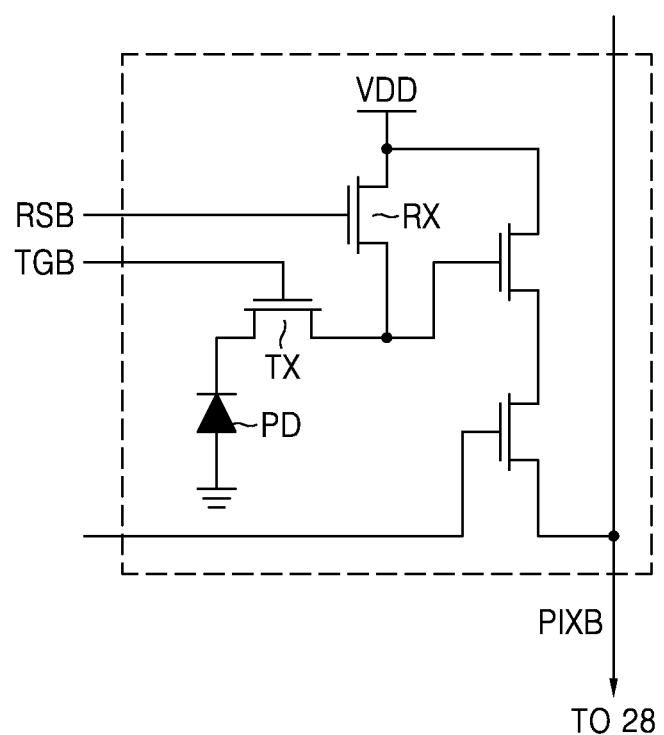
FIG. 23 is a circuit diagram of the other of the pixels which are comparative targets illustrated in FIGS. 18 through 21.
Figure 24:
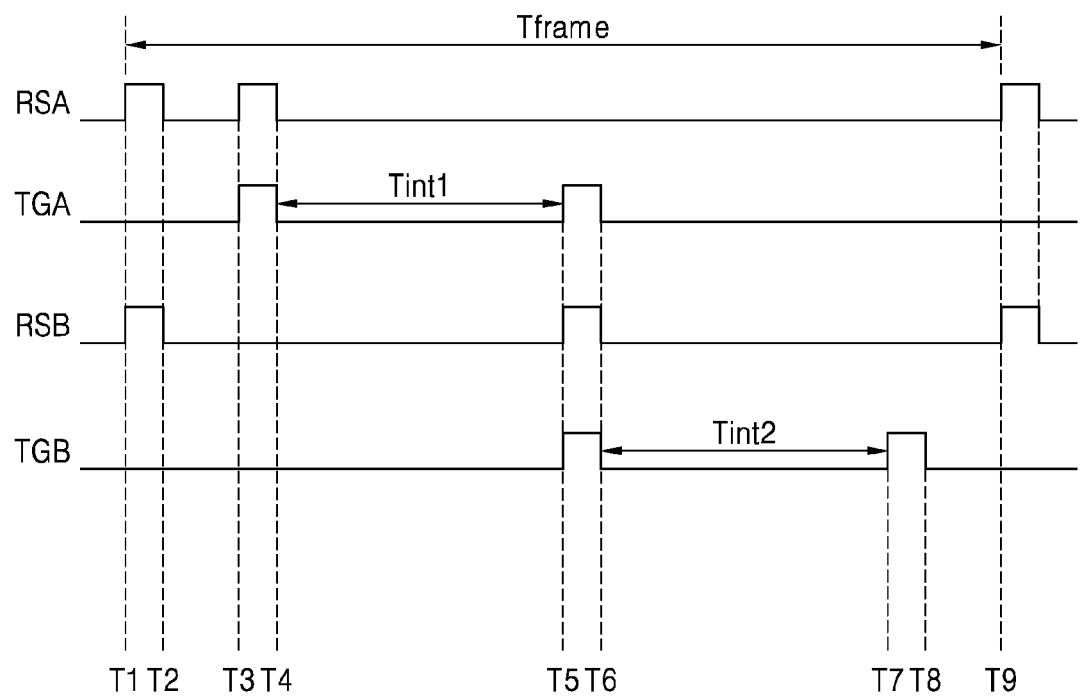
FIG. 24 is a timing diagram of control signals supplied to each of the pixels which are comparative targets illustrated in FIGS. 22 and 23.

FIG. 22 is a circuit diagram of one of pixels which are comparative targets illustrated in FIGS. 18 through 21. FIG. 23 is a circuit diagram of the other of pixels which are comparative targets illustrated in FIG. 18 through 21. FIG. 24 is a timing diagram of control signals supplied to each of pixels which are comparative targets illustrated in FIGS. 22 and 23.

Referring to FIGS. 22 through 24, each reset signal RSA or RSB may perform a reset operation by controlling a reset transistor RX included in each pixel 26''-1 or 26''-2.

Each transmission signal TGA or TGB may control a transmission transistor TX included in each pixel 26''-1 or 26''-2. A reset signal RSA is activated for a first time at a first time point T1 and deactivated at a second time point T2, activated for a second time at a third time point T3 and deactivated at a fourth time point T4, and activated again at a ninth time point T9. A reset signal RSB is activated for a first time at a first time point T1 and deactivated at a second time point T2, activated for a second time at a fifth time point T5 and deactivated at a sixth time point T6, and activated again at a ninth time point T9.

A first activation of each reset signal RSA or RSB is for reading a reset value of each pixel 26''-1 or 26''-2, and a second activation is for resetting a charge generated before an integration interval of each pixel 26''-1 or 26'-2 starts. In this case, the time period extending form a first time point T1 to a ninth time point T9 corresponds to a frame period Tframe.

A transmission signal TGA supplied to the first pixel 26''-1 is activated for a first time at a third time point T3 and deactivated at a fourth time point T4, and activated for a second time at a fifth time point T5 and deactivated at a sixth time point T6. That is, the time period extending from the fourth time point T4 to the fifth time point T5 is a first integration time Tint1 for the first pixel 26''-1 to perform an integrating operation.

A transmission signal TGB supplied to the second pixel 26''-2 is activated for a first time at a fifth time point T5 and deactivated at a sixth time point T6, and activated for a second time at a seventh time point T7 and deactivated at an eighth time point T8. That is, the time period extending from the sixth time point T6 to the seventh time point T7 is a second integration time Tint2 for the first pixel 26''-1 to perform an integrating operation.

The first integration time Tint1 and the second integration time Tint2 are contained in a same a frame (i.e., occur within the same frame period), and are not overlapped to each other.

Figure 25:
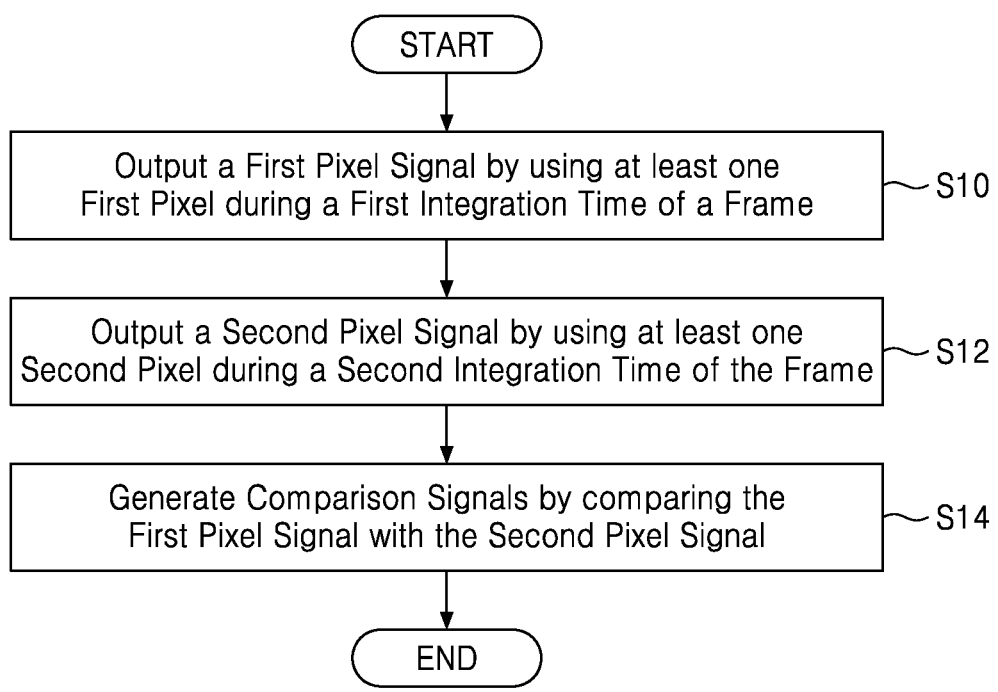
FIG. 25 is a flowchart of a motion sensing method for an image sensor according to an example embodiment of the present inventive concepts.

FIG. 25 is a flowchart of a method for sensing an operation of an image sensor according to an example embodiment of the present inventive concepts. Referring to FIGS. 1 through 25, the image sensor 100 may output a first pixel signal PIXA by using at least one first pixel 26-1 during a first integration time Tint1 of a frame (S10).

According to an example embodiment, when a unit pixel 26' included in the image sensor 100 has a four-tap structure, the image sensor 100 may output a first pixel signal, e.g., a sum signal PIXAB or PIXAC, by using two pixels 26'-1 and 26'-2 or 26'-1 and 26'-3.

The image sensor 100 may output a second pixel signal PIXB by using at least one second pixel 26-2 during a second integration time Tint2 of the frame (S12). According to an example embodiment, when the unit pixel 26' included in the image sensor 100 has a four tap structure, the image sensor 100 may output a second pixel signal, e.g., a sum signal PIXCD or PIXBD, by using two pixels 26'-3 and 26'-4 or 26'-2 and 26'-4.

Each of the comparators 42 and 44 may compare the first pixel signal PIXA with the second pixel signal PIXB each other and generate each of the comparison signals SCOMP1 and SCOMP2 (S14).

Figure 26:
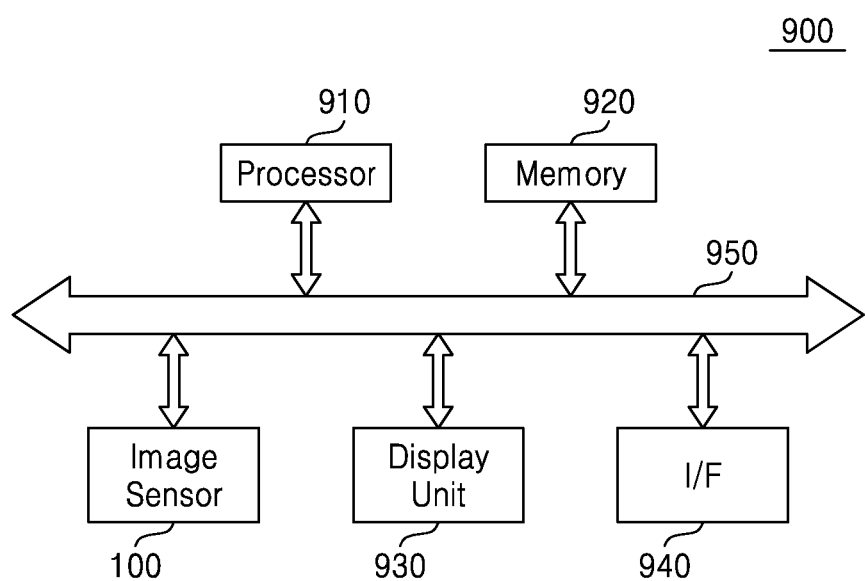
FIG. 26 is a block diagram of an image processing system according to an example embodiment including the image sensor illustrated in FIG. 1.

FIG. 26 is a block diagram of an image processing system according to an example embodiment including the image sensor illustrated in FIG. 1. Referring to FIGS. 1 and 26, an image processing system 900 may include the image sensor 100, a processor 910, a memory 920, a display unit 930 and an interface 940.

The processor 910 may control an operation of the image sensor 100 or process image data output from the image sensor 100. For example, the processor 910 may generate two-dimensional or three-dimensional image data based on color information, depth information and/or motion information of an object output from the image sensor 100. According to an example embodiment, the processor 910 may mean the ISP 200.

The memory 920 may store a program for controlling an operation of the image sensor 100 through a bus 950 according to a control of the processor 910 and an image generated by the processor 910, and the processor 910 may execute the program by accessing stored information. The memory 920 may be embodied in, for example, a non-volatile memory.

The display unit 930 may receive an image from the processor 910 or the memory 920 and display it through a display, e.g., a liquid crystal display (LCD), a LED display, a OLED display, an active matrix organic light emitting diodes (AMOLED) display or a flexible display.

An interface 940 may be embodied in an interface for inputting/outputting a two dimensional or a three dimensional image. According to an example embodiment, the interface 940 may be embodied in a radio interface.

Figure 27:
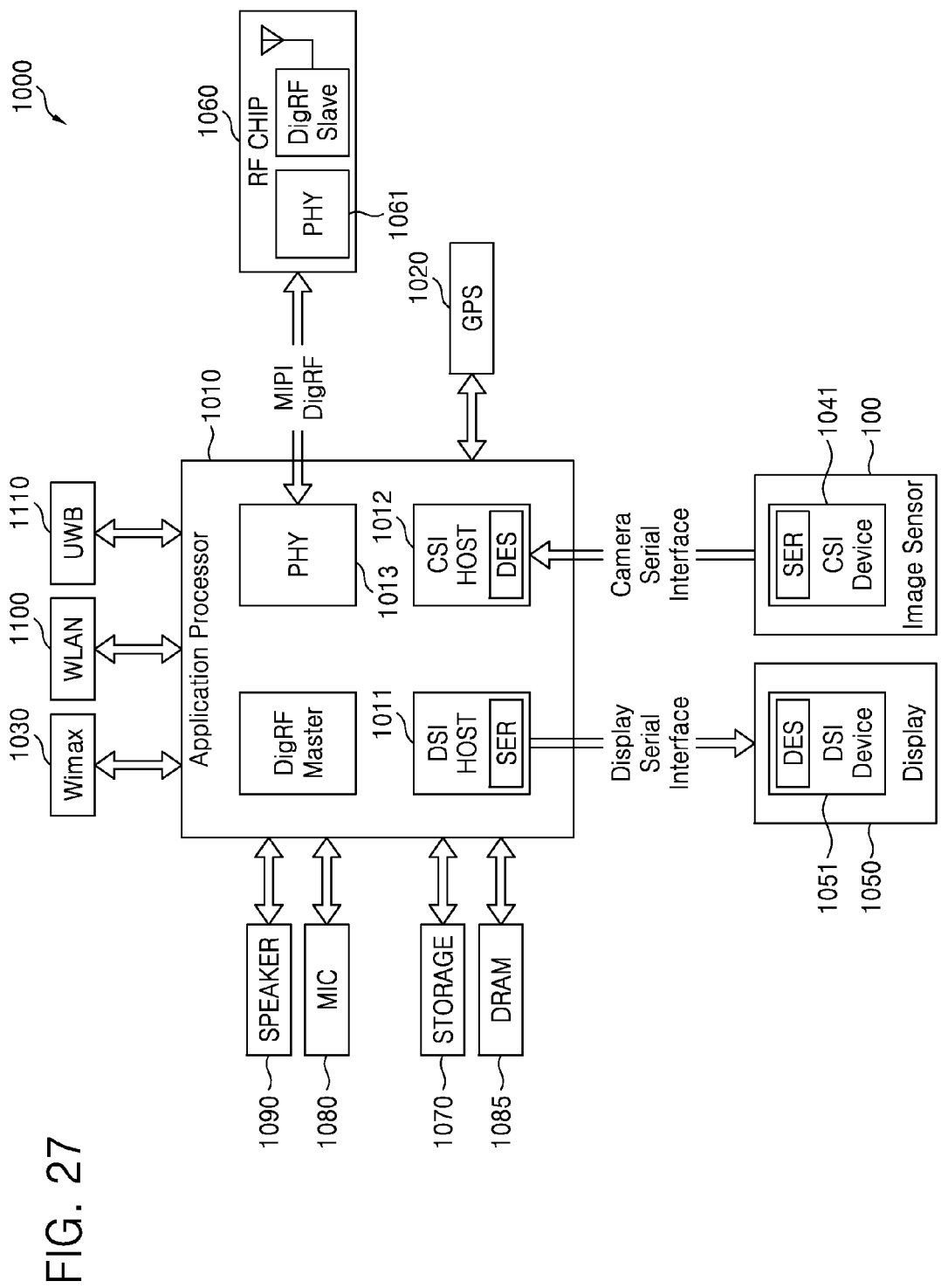
FIG. 27 is a block diagram of an electronic system according to an example embodiment including the image sensor illustrated in FIG. 1.

FIG. 27 is a block diagram of an electronic system according to an example embodiment including the image sensor illustrated in FIG. 1. Referring to FIGS. 1 and 27, an electronic system 1000 may be embodied in a data processing device which may use or support a mobile industry processor interface (MIPI®), e.g., a personal digital assistant (PDA), a portable multimedia player (PMP), an internet protocol television (IPTV) or a smart phone.

The electronic system 1000 includes the image sensor 100, an application processor 1010 and a display 1050. A camera serial interface (CSI) host 1012 embodied in the application processor 1010 may perform a serial communication with a CSI device 1041 of the image sensor 100 through a camera serial interface (CSI). Here, for example, the CSI host 1012 may include a deserializer (DES), and the CSI device 1041 may include a serializer (SER).

A DSI host 1011 embodied in the application processor 1010 may perform a serial communication with a DSI device 1051 of the display 1050 through a display serial interface (DSI). Here, for example, the DSI host 1011 may include a serializer (SER), and the DSI device 1051 may include a deserializer (DES).

According to an example embodiment, the electronic system 1000 may further include a RF chip 1060 which may communicate with the application processor 1010. A Physical layer (PHY) 1013 included in the application processor 1010 and a PHY 1061 included in a RF chip 1060 may transmit or receive data according to MIPI DigRF. According to an example embodiment, the electronic system 1000 may further include a GPS receiver 1020, a storage 1070, a microphone (MIC) 1080, a dynamic random access memory (DRAM) 1085, and a speaker 1090.

The electronic system 1000 may communicate by using a world interoperability for microwave access (Wimax) 1030, a wireless LAN (WLAN) 1100 and/or a ultra wideband (UWB) 1110.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image sensor, comprising:
a first pixel configured to generate a first pixel signal during a first integration time of a frame period;
a second pixel configured to generate a second pixel signal during a second integration time of the frame period; and
a readout circuit configured to generate comparison signals by comparing the first pixel signal and the second pixel signal,
wherein the readout circuit includes:
a ramp signal generator configured to generate a ramp signal;
a first comparator;
a second comparator; and
a switch array configured to transmit the first pixel signal and one of the second pixel signal and the ramp signal to the first comparator, and to transmit the second pixel signal and one of the first pixel signal and the ramp signal to the second comparator, in response to switch signals.

2. The image sensor of claim 1, further comprising:
a mode selection circuit configured to generate a clock adjusting signal and the switch signals in response to a mode selection signal;
a clock signal generator configured to generate a first clock signal or a second clock signal in response to the clock adjusting signal; and
counters each configured to count a level transition time of each of the comparison signals in response to the first clock signal or the second clock signal.

3. The image sensor of claim 2, wherein the first clock signal has a one clock cycle during the frame period, and the second clock signal has a plurality of clock cycles during the frame period.

4. The image sensor of claim 1, wherein the readout circuit further includes summation circuits each for adding an offset signal to each of the first pixel signal and the second pixel signal.

5. An image sensor, comprising:
a first pixel configured to generate a first pixel signal during a first integration time of a frame period;
a second pixel configured to generate a second pixel signal during a second integration time of the frame period; and
a readout circuit configured to generate comparison signals by comparing the first pixel signal and the second pixel signal,
wherein the readout circuit includes:
a first comparator;
a second comparator; and
a switch array configured to add the first pixel signal and a third pixel signal output from one of third pixels and transmit a first resultant summation signal to the first comparator, and to add the second pixel signal and a fourth pixel signal from the other of the third pixel signals and transmit a resultant second summation signal to the second comparator, in response to switch signals.

6. The image sensor of claim 5, wherein the readout circuit further comprises:
a first summation circuit configured to add the third pixel signal and the first pixel signal; and
a second summation circuit configured to add the fourth pixel signal and the first pixel signal.

7. The image sensor of claim 6, further comprising a direction selection circuit configured to generate the switch signals.

8. An image sensor comprising:
an image sensor array including an array of unit pixels, each of the unit pixels including at least a first pixel and a second pixel;
a decoder circuit configured to apply successive reset signals to the first and second pixels of the unit pixel, the successive reset signals defining a frame period of the unit pixel, wherein the first pixel is active during a first integration time of the frame period, and the second pixel is active during a second integration time of the frame period;
a comparator circuit configured to compare an output of the first pixel corresponding to the first integration time of the frame period and an output of the second pixel corresponding to the second integration time of the frame period, and to output a comparison result,
wherein the first integration time of the frame period does not overlap the second integration time of the frame period.

9. The image sensor of claim 8, further comprising a clock circuit configured to apply a first clock pulse to the first pixel to activate the first pixel during the first integration time of the frame period, and to apply a second clock pulse to the second pixel to activate the second pixel during the second integration time of the frame period, wherein the first pulse does not overlap the second clock pulse.

10. The image sensor of claim 8, wherein the comparator circuit comprises:
a voltage adder configured to add a first offset voltage to the output of the first pixel to obtain a first offset pixel signal, and to add a second offset voltage to the output of the second pixel to obtain a second offset pixel signal;
a first comparator configured to compare the output of the second pixel with the first offset pixel signal; and
a second comparator configured to compare the output of the first pixel with the second offset pixel signal.

11. The image sensor of claim 8, wherein the unit pixel is a time-of-flight (TOF) sensor pixel.

12. A system on chip (SoC), comprising:
an image sensor;
a central processing unit (CPU) configured to transmit a mode selection signal for selecting an operation mode to the image sensor; and
an image signal processor (ISP) configured to process image data output from the image sensor,
wherein the image sensor includes:
a first pixel configured to generate a first pixel signal during a first integration time of a frame period;
a second pixel configured to generate a second pixel signal during a second integration time of the frame period;
a readout circuit configured to generate comparison signals by comparing the first pixel signal and the second pixel signal in response to the mode selection signal;
a mode selection circuit configured to generate a clock adjusting signal and switch signals in response to the mode selection signal;
a clock signal generator configured to generate a first clock signal or a second clock signal in response to the clock adjusting signal; and
counters each configured to count each of the comparison signals in response to the first clock signal or the second clock signal.

13. The SoC of claim 12, wherein the readout circuit includes:
a ramp signal generator configured to generate a ramp signal;
a first comparator;
a second comparator; and
a switch array configured to transmit the first pixel signal and one of the second pixel signal and the ramp signal to the first comparator, and to transmit the second pixel signal and one of the first pixel signal and the ramp signal to the second comparator, in response to the switch signals.

14. The SoC of claim 12, wherein the first clock signal has a one clock cycle during the frame period, and the second clock signal has a plurality of clock cycles during the frame period.

15. A system on chip (SoC), comprising:
an image sensor;
a central processing unit (CPU) configured to transmit a mode selection signal for selecting an operation mode to the image sensor; and
an image signal processor (ISP) configured to process image data output from the image sensor,
wherein the image sensor includes:
a first pixel configured to generate a first pixel signal during a first integration time of a frame period;
a second pixel configured to generate a second pixel signal during a second integration time of the frame period;
a readout circuit configured to generate comparison signals by comparing the first pixel signal and the second pixel signal in response to the mode selection signal;
a light source configured to output an optical signal incident towards an object; and
a pass filter configured to pass a reflected optical signal from the object to the first pixel or the second pixel,
wherein an intensity of the optical signal or whether the optical signal is modulated is determined based on the mode selection signal.

* * * * *